(12) United States Patent
Biegler et al.

(10) Patent No.: US 9,126,224 B2
(45) Date of Patent: Sep. 8, 2015

(54) APPARATUS AND METHODS FOR IMPINGING FLUIDS ON SUBSTRATES

(75) Inventors: Kristopher K. Biegler, Minneapolis, MN (US); Michael R. Gorman, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1240 days.

(21) Appl. No.: 13/029,155

(22) Filed: Feb. 17, 2011

(65) Prior Publication Data

US 2012/0213934 A1 Aug. 23, 2012

(51) Int. Cl.
*B05D 3/04* (2006.01)
*B05C 5/02* (2006.01)
*B05C 5/00* (2006.01)
*B05C 11/10* (2006.01)
*B29C 65/10* (2006.01)
*B32B 37/04* (2006.01)
(Continued)

(52) U.S. Cl.
CPC .............. *B05C 5/0258* (2013.01); *B05C 5/001* (2013.01); *B05C 5/0245* (2013.01); *B05C 11/1039* (2013.01); *B29C 65/103* (2013.01); *B29C 66/45* (2013.01); *B29C 66/81423* (2013.01); *B29C 66/83415* (2013.01); *B32B 37/04* (2013.01); *B32B 37/06* (2013.01); *B32B 37/20* (2013.01); *B29C 66/348* (2013.01); *B29C 66/71* (2013.01); *B29C 66/723* (2013.01); *B29C 66/729* (2013.01); *B29C 66/7294* (2013.01); *B29C 66/73921* (2013.01); *B29C 66/83413* (2013.01); *B29C 66/9141* (2013.01); *B29C 66/91413* (2013.01); *B29C 66/91431* (2013.01); *B29C 66/91645* (2013.01); *B32B 37/0053* (2013.01); *B32B 2305/20* (2013.01); *B32B 2309/12* (2013.01); *B32B 2310/0454* (2013.01)

(58) Field of Classification Search
CPC .... B05C 5/001; B05C 5/0258; B29C 65/103; B29C 66/45
See application file for complete search history.

(56) References Cited

U.S. PATENT DOCUMENTS 3,843,480 A * 10/1974 Dreher .......................... 428/354
5,147,690 A * 9/1992 Faust et al. ................. 427/372.2
(Continued)

FOREIGN PATENT DOCUMENTS

CN 1235879 A 11/1999
DE 296 17 525 12/1996
(Continued)

OTHER PUBLICATIONS

International Search Report, PCT/US2012/025053, Oct. 16, 2012, 4 pages.
(Continued)

*Primary Examiner* — Cachet Sellman

(57) ABSTRACT

Herein are disclosed apparatus and methods for impinging fluids, e.g. heated fluids, onto the surface of moving substrates and then locally removing the impinged fluid. The apparatus may comprise at least first and second fluid delivery outlets that are in diverging relation to each other. A long axis of the first fluid delivery outlet may be oriented obliquely to the path of the first moving substrate, and a long axis of the second fluid delivery outlet may be oriented obliquely to the path of the second moving substrate. The apparatus may comprise at least first and second fluid capture inlets that are locally positioned relative to the first and second fluid delivery outlets, respectively.

12 Claims, 10 Drawing Sheets

(51) Int. Cl.
   *B32B 37/06*   (2006.01)
   *B32B 37/20*   (2006.01)
   *B29C 65/00*   (2006.01)
   *B32B 37/00*   (2006.01)

(56) References Cited

U.S. PATENT DOCUMENTS

| | | |
|---|---|---|
| 5,660,224 A | 8/1997 | Barbe |
| 5,976,249 A | 11/1999 | Stahl |
| 6,066,221 A | 5/2000 | Marmon |
| 6,256,903 B1 | 7/2001 | Rudd |
| 2004/0068848 A1 | 4/2004 | Ausen |
| 2004/0251583 A1 | 12/2004 | Park |
| 2006/0248745 A1 | 11/2006 | Viswanath |
| 2008/0264599 A1 | 10/2008 | Blejde |
| 2010/0288186 A1 | 11/2010 | Bang |
| 2011/0147475 A1* | 6/2011 | Biegler et al. ............ 239/1 |
| 2011/0151171 A1* | 6/2011 | Biegler et al. ............ 428/57 |

FOREIGN PATENT DOCUMENTS

| | | |
|---|---|---|
| WO | WO 98-31475 | 7/1998 |
| WO | WO 2011-087750 | 7/2011 |

OTHER PUBLICATIONS

Biegler, U.S. Appl. No. 12/974,329, filed Dec. 21, 2010.
Biegler, U.S. Appl. No. 12/974,536, filed Dec. 21, 2010.

* cited by examiner

APPARATUS AND METHODS FOR IMPINGING FLUIDS ON SUBSTRATES

BACKGROUND

Fluids, e.g. heated fluids, are often impinged upon a substrate for a variety of purposes. For example, heated fluids may be impinged upon a substrate for purposes of annealing, drying of a surface coating, promoting a chemical reaction or a physical change, and the like. Often, the impinged fluid is allowed to escape into the surrounding atmosphere, where it may be allowed to disperse or may be at least partially removed by a duct, hood, or the like.

SUMMARY

Herein are disclosed apparatus and methods for impinging fluids, e.g. heated fluids, onto the surface of moving substrates and then locally removing the impinged fluid. The apparatus may comprise at least first and second fluid delivery outlets that are in diverging relation to each other. A long axis of the first fluid delivery outlet may be oriented obliquely to the path of the first moving substrate, and a long axis of the second fluid delivery outlet may be oriented obliquely to the path of the second moving substrate. The apparatus may comprise at least first and second fluid capture inlets that are locally positioned relative to the first and second fluid delivery outlets, respectively.

In one aspect, disclosed herein is an apparatus for impinging a fluid onto a first surface of a first substrate that is moving along a first substrate path and impinging a fluid onto a first surface of a second substrate that is moving along a second substrate path and locally removing the impinged fluids, comprising: at least one first fluid delivery outlet with a long axis that is oriented obliquely to the first substrate path; at least one first fluid capture inlet that is locally positioned relative to the first fluid delivery outlet; at least one second fluid delivery outlet with a long axis that is oriented obliquely to the second substrate path; at least one second fluid capture inlet that is locally positioned relative to the second fluid delivery outlet; and wherein the at least one first fluid delivery outlet and the at least one second fluid delivery outlet are in diverging relation.

In another aspect, disclosed herein is a method of impinging a heated fluid onto a first surface of a first substrate that is moving along a first substrate path and impinging a fluid onto a first surface of a second substrate that is moving along a second substrate path and locally removing the impinged fluids, the method comprising: providing at least one first fluid delivery outlet and at least one first fluid capture inlet that is locally positioned relative to the first fluid delivery outlet; passing the first moving substrate by the at least one first fluid delivery outlet along a first substrate path such that a long axis of the at least one first fluid delivery outlet is oriented obliquely to the first substrate path and impinging heated fluid from the at least one first fluid delivery outlet onto the first major surface of the first moving substrate; providing at least one second fluid delivery outlet and at least one second fluid capture inlet that is locally positioned relative to the second fluid delivery outlet; passing the second moving substrate by the at least one second fluid delivery outlet along a second substrate path such that a long axis of the at least one second fluid delivery outlet is oriented obliquely to the second substrate path and impinging heated fluid from the at least one second fluid delivery outlet onto the first major surface of the second moving substrate; and, locally capturing at least 60% of the total volumetric flow of impinged fluid by way of the fluid capture inlets and removing the locally captured fluid through fluid removal channels that are fluidly connected to the fluid capture inlets; and wherein the first and second moving substrates are converging substrates.

Like reference numbers in the various figures indicate like elements. Some elements may be present in similar or identical multiples; in such cases the elements may comprise the same reference number, e.g. with one or more of the elements designated by a prime (') or primes for convenience of description. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", bottom", "upper", lower", "under", "over", "front", "back", "outward", "inward", "up" and "down", and "first" and "second" may be used in this disclosure, it should be understood that those terms are used in their relative sense only unless otherwise noted.

DETAILED DESCRIPTION

Figure 1:
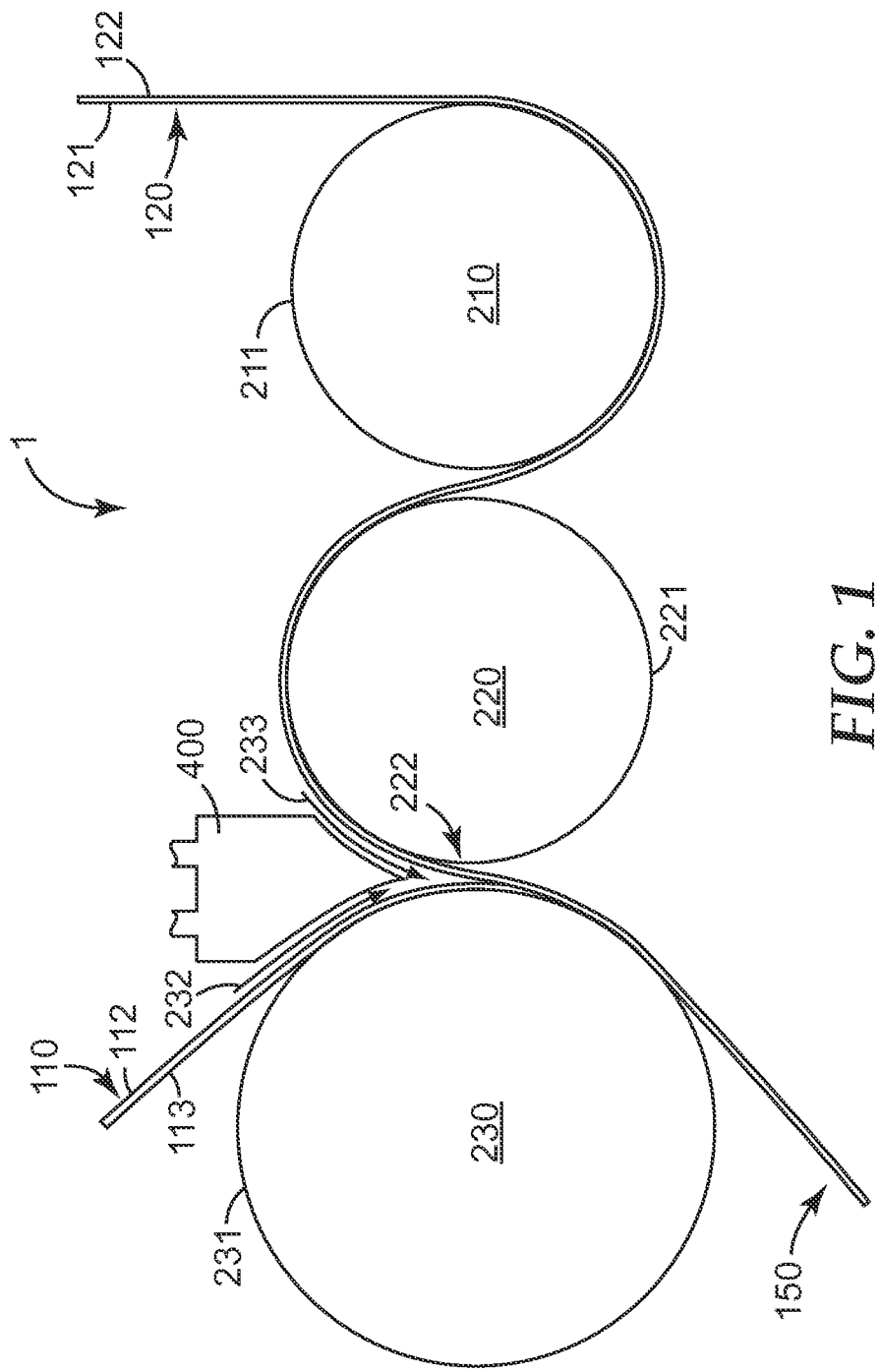
FIG. 1 is a side view of an exemplary apparatus and process that may be used to bond a first substrate to a second substrate.
Figure 2:
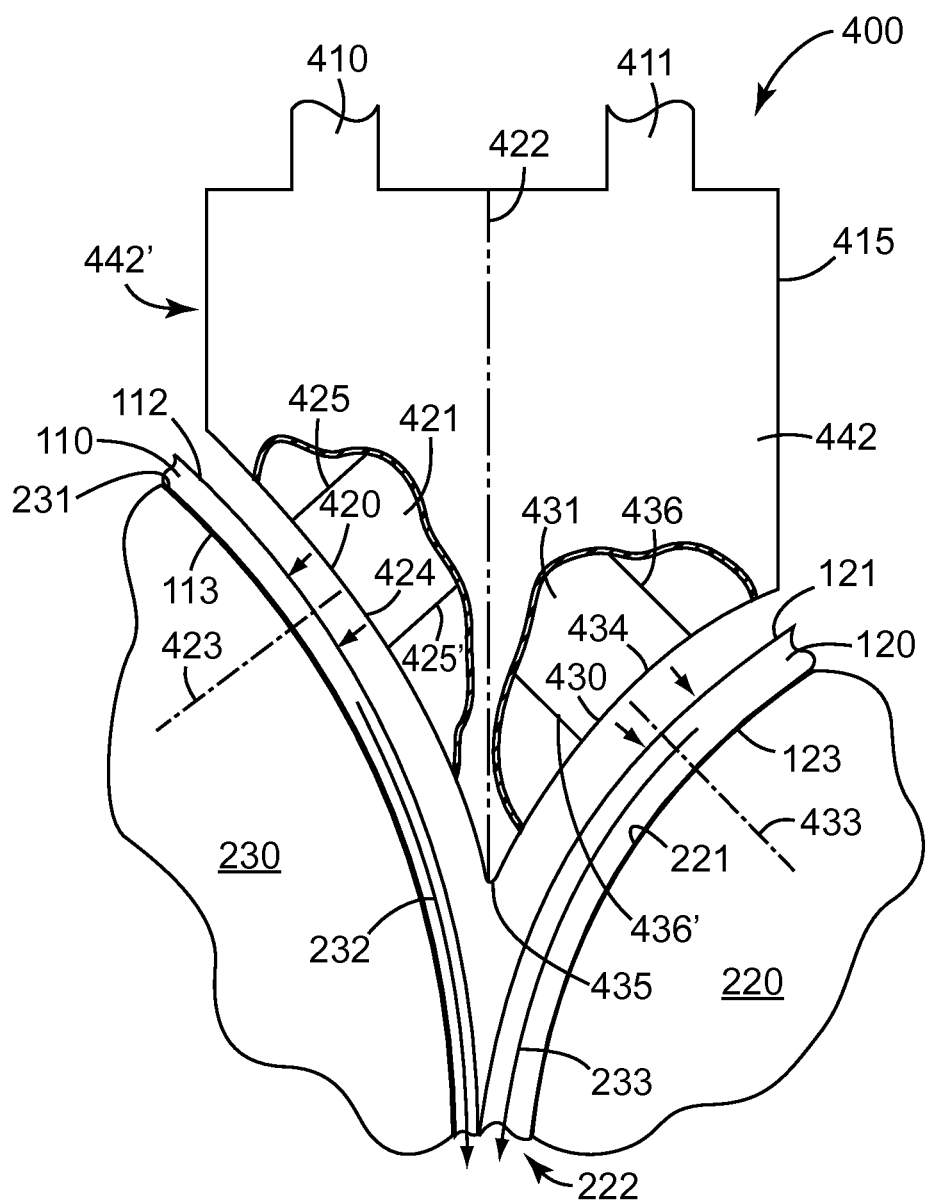
FIG. 2 is an expanded side view in partial cutaway of a portion of the exemplary apparatus and process of FIG. 1.
Figure 3:
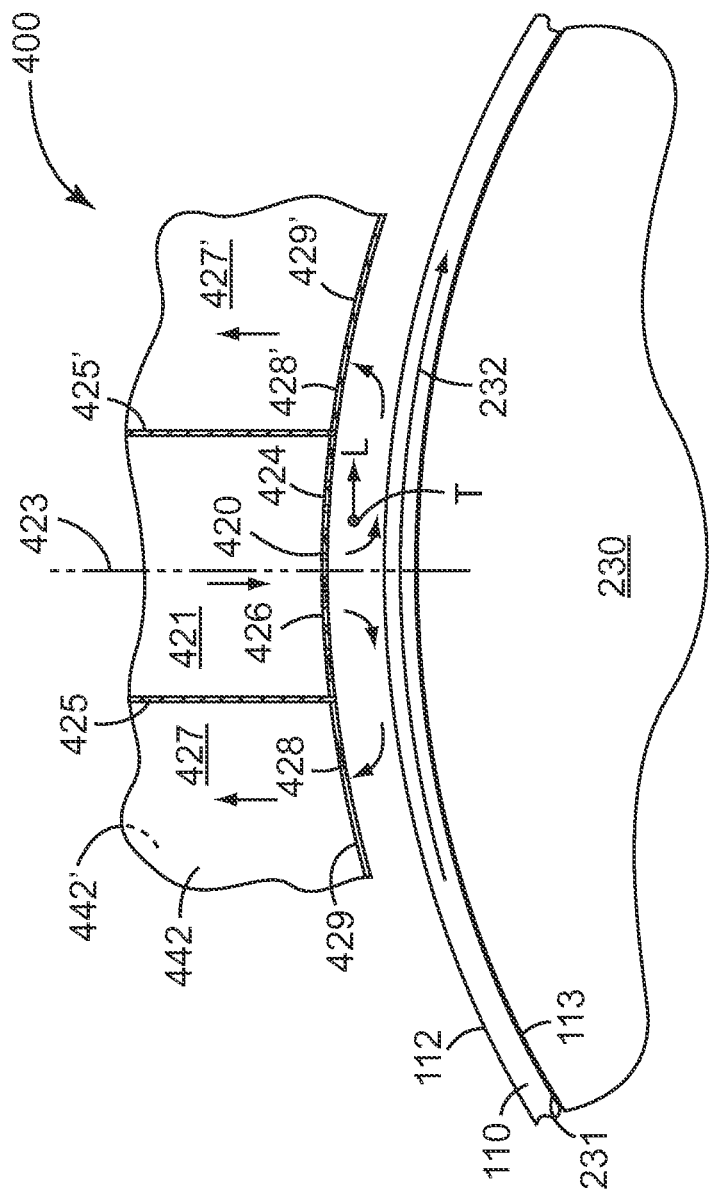
FIG. 3 is a further expanded side view in cutaway of a portion of the exemplary apparatus and process of FIG. 1.

Shown in FIG. 1 is an exemplary apparatus 1 that can be used at least to achieve the bonding of first substrate 110 and second substrate 120 to each other by way of impinging fluids, e.g. heated fluids, onto major surface 112 of substrate 110 and onto major surface 121 of substrate 120 and then bringing major surfaces 112 and 121 into contact with each other. Shown in FIG. 2 is an expanded side view in partial cutaway of portions of apparatus 1 that are used to process first and second substrates 110 and 120. In FIG. 3 is a further expanded side view in partial cutaway of portions of apparatus 1 that are used to process first substrate 110. Descriptions herein, and references to various figures, may focus in some cases on the processing of first substrate 110 for purposes of brevity. However, it will be understood that the nozzles disclosed and described herein may comprise similar components, features and/or functionalities with regard to the processing of second substrate 120. Accordingly, all such descriptions of structures, features and functionalities contained herein with regard to the processing of first substrate 110, should be considered as being equally applicable to the processing of second substrate 120.

In the exemplary embodiments illustrated in these Figures, first substrate 110 is in contact with first backing surface 231 and moves along first substrate path 232 guided thereby, with first substrate path 232 being generally aligned with the longitudinal axis "L" of substrate 110 (e.g., as shown in FIG. 3). Similarly, second substrate 120 is in contact with second backing surface 221 and moves along second substrate path 233 guided thereby, with second substrate path 233 being likewise generally aligned with the longitudinal axis of substrate 120. Substrate paths 232 and 233 may often be generally arcuate as pictured in the exemplary illustrations of FIGS. 1 and 2; however, the exact curvature of each path may differ, e.g. depending on the diameter of backing roll 230 and backing roll 220. Substrate paths 232 and 233 may be converging paths, meaning that substrate 110 and substrate 120 are converging substrates that, upon following their respective paths, will come into contact with each other (e.g., major surfaces 112 and 121 will come into contact with each other) immediately after passing adjacent to fluid delivery outlets 420 and 430 respectively, without having first undergone a change of direction, passing around any rollers, or the like.

In addition to helping guide substrates 110 and 120, backing surfaces 231 and 221 may serve to support the substrates, and also may optionally be cooled to a certain amount (e.g. 100, 200, or 300 or more degrees C. below the temperature of the impinging heated fluid), so as to assist in keeping at least the interior portion of the substrates sufficiently cool to prevent or minimize damage, melting, etc., of the substrates, during the time that major surfaces of the substrate (e.g., first major surface 112 of substrate 110, and first major surface 121 of second substrate 120) are heated so as to facilitate the bonding together of the major surfaces. If a substrate is discontinuous or porous (e.g., if the substrate is a fibrous web) such a (e.g., solid, nonporous) backing surface may also serve to occlude the second major surface of the substrate so that the impinging fluid does not penetrate through the thickness of the substrate and exit through the second major surface of the substrate. Thus in these embodiments, the heating of a major surface of a substrate by the impinging of heated fluid as described herein, does not encompass methods in which heated fluid is impinged upon a major surface of a substrate and passed through the substrate so as to exit through the oppositely-facing major surface.

Such a backing surface may in some embodiments be provided by a backing roll. Thus, in the exemplary illustration of FIG. 1, second major surface 113 of first substrate 110 is in contact with first backing surface 231 of first backing roll 230 during the impinging of heated fluid onto first major surface 112 of first substrate 110. Likewise, second major surface 122 of second substrate 120 is in contact with second backing surface 221 of second backing roll 220 during the impinging of heated fluid onto first major surface 121 of second substrate 120. In some embodiments, a preheat roll can optionally be used to preheat a surface of one or both of substrates 110 and 120 prior to the impinging of the heated fluids. In the exemplary illustration of FIG. 1, major surface 121 of substrate 110 is brought into contact with surface 211 of preheat roll 210 prior to the impinging of heated fluid onto major surface 121 of substrate 110.

In the illustrated embodiment of FIGS. 1 and 2, backing roll 220 and backing roll 230 combine to form lamination nip 222 in which first major surface 112 of substrate 110 and first major surface 121 of substrate 120 are brought into contact with each other while at a temperature (established by the heated fluid impingement) sufficient to cause at least surface-bonding of substrates 110 and 120 to each other. It may be advantageous to perform such bonding under conditions which minimize any damage, crushing and the like, to any component of substrates 110 and 120. This may be particularly useful in the event that, e.g. one of the substrates comprises an easily crushable (e.g., nonwoven) fibrous web and/or comprises protrusions that might be susceptible to being deformed or crushed. Thus, backing rolls 230 and 220 may be arranged so as to operate nip 222 at very low pressure in comparison to the pressures normally used in the lamination of materials (for which relatively high pressure is often preferred). In various embodiments, the bonding of substrates 110 and 120 together may be performed with a lamination nip pressure of less than about 15 pounds per linear inch (27 Newtons per linear cm), less than about 10 pli (18 Nlc), or less than about 5 pli (9 Nlc). In further embodiments, backing roll 230, backing roll 220, or both, may comprise at least a surface layer of a relatively soft material (e.g., a rubber material with a hardness of less than 70 on the Shore A scale). Such a relatively soft surface layer may be achieved e.g. by the use of a roll with a permanently attached soft surface coating, by the use of a removable sleeve of soft material, by covering the surface of the backing roll with relatively soft and resilient tape, and the like. If desired, the surface of one or both backing rolls may be stepped across the face of the roll so a to provide lamination pressure selectively in certain locations.

Upon exiting lamination nip 222, laminate 150 may be cooled if desired, e.g. by contacting one or both major surfaces of laminate 150 with a cooling roll, by the impinging of a cooling fluid upon one or both surfaces of laminate 150, and the like. Laminate 150 may thereafter be processed through any suitable web-handling process, rolled up, stored, etc. For example, additional layers may be coated or laminated on laminate 150, individual pieces may be cut therefrom as described previously, and so on.

Those of ordinary skill in the art will appreciate that the heating of multiple substrates, e.g. converging substrates, by impinging heated fluid onto a first major surface of a first moving substrate and the impinging of heated fluid onto a first major surface of a second moving substrate (in particular as achieved by use of the nozzles described later herein), may be suitable for many uses, including uses other than the aforementioned bonding or surface-bonding. For example, such methods may be used to evaporate liquids from substrates, to modify the surface structure of substrates by annealing or the like, to promote a chemical reaction or surface modification, to dry, harden, and/or crosslink a coating present on the surface, and so on.

Figure 4:
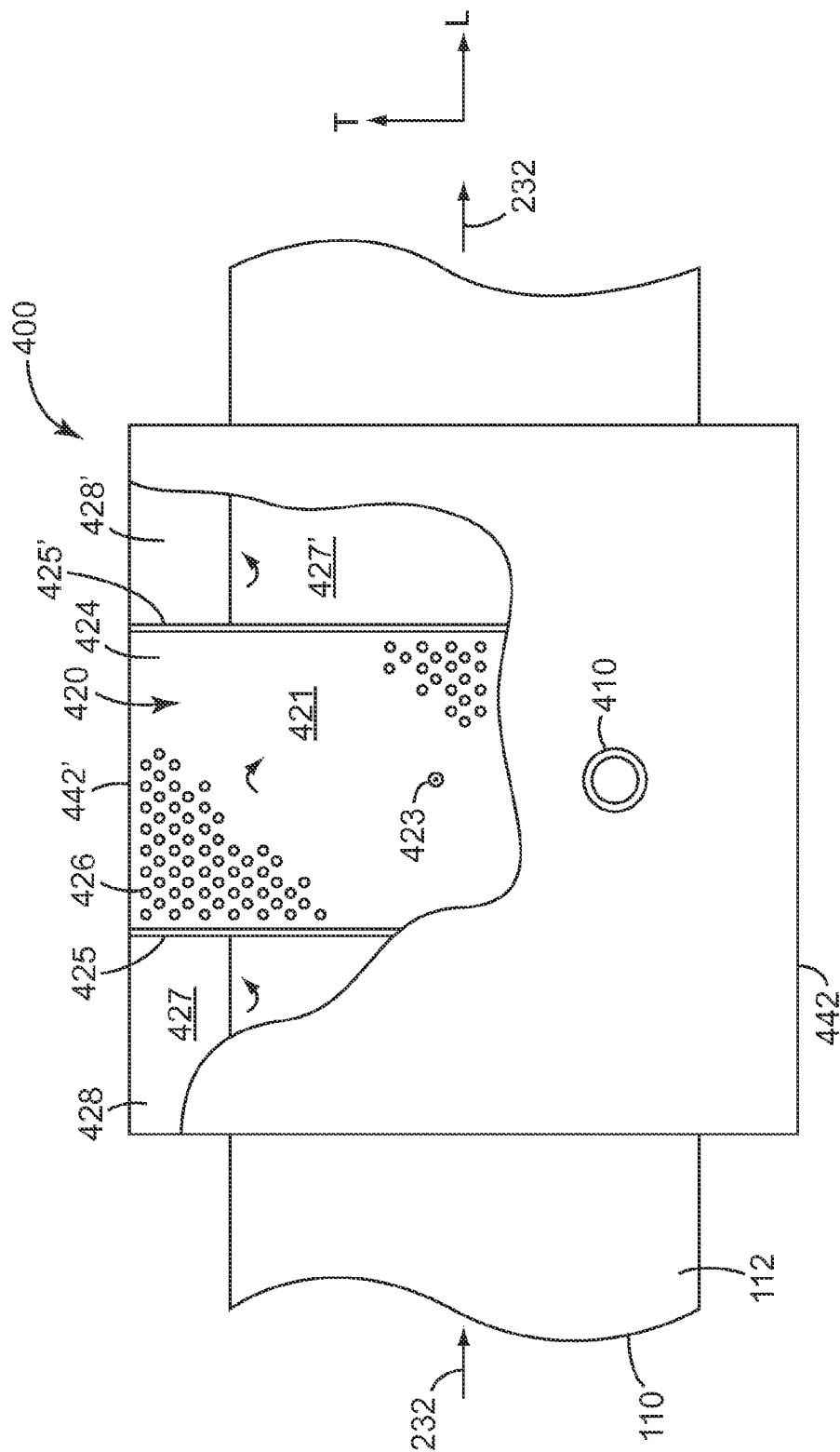
FIG. 4 is a plan view in partial cutaway of a portion of the exemplary apparatus and process of FIG. 1.

The impinging of heated fluid onto first major surface 112 of substrate 110, and the impinging of heated fluid onto first major surface 121 of substrate 120, may be achieved by the use of a nozzle. An exemplary nozzle 400 is shown in FIG. 1 and is shown in greater detail in side view in FIG. 2, and in still greater detail in side view in FIG. 3, which, for additional clarity of presentation, presents only that portion of nozzle 400 involved in processing of first substrate 110 and not the portion involved in processing of second substrate 120. In FIGS. 1-3, apparatus 1 is viewed from along an axis that is generally transverse to substrate paths 232 and 233, is generally parallel to the axis of rotation of backing rolls 220 and 230, and is generally parallel to the transverse axis "T" of the substrates. To provide further clarity, FIG. 4 presents a plan view, in partial cutaway, looking through nozzle 400 (toward substrate 110) generally along axis 423 of FIG. 2 (in this view, and in similar views of other exemplary nozzles in FIGS. 6-10, any slight curvature of the fluid delivery outlets, inlets, etc., is disregarded). With reference to FIG. 2, nozzle 400 comprises at least a first fluid delivery outlet 420, through which heated fluid may be impinged onto first major surface 112 of substrate 110, and a second fluid delivery outlet 430 through which heated fluid may be impinged onto first major surface 121 of substrate 120. (References herein to first fluid delivery outlet, second fluid delivery outlet, etc. are used for convenience of differentiating separate outlets, etc. from each other, and should not be interpreted as requiring that the fluids delivered by the different outlets must differ in composition, temperature, etc.). First fluid delivery outlet 420 is supplied with heated fluid by first fluid delivery channel 421 to which it is fluidly connected, and second fluid delivery outlet 430 is supplied with heated fluid by second fluid delivery channel 431 to which it is fluidly connected.

In some embodiments, nozzle 400 may comprise a single interior plenum (chamber) supplied with heated fluid from an external source (not shown) by way of supply line 410, with heated fluid being directed to first and second fluid delivery outlets 420 and 430 from the single common plenum. Thus in such embodiments, first and second fluid delivery outlets 420 and 430 may deliver heated fluid from a common source at similar or identical conditions. In alternative embodiments, the interior of nozzle 400 may be divided into a first fluid delivery channel 421 and a second fluid delivery channel 431 that are physically separate and that are not fluidly connected with each other. In such case, second fluid delivery channel 431 and second fluid delivery outlet 430 may be supplied, by second fluid supply line 411, with a heated fluid that is different (e.g., that is air at a different temperature, pressure, velocity, etc.), from the heated fluid supplied by first fluid supply line 410 to first fluid delivery channel 421 and first fluid delivery outlet 420.

While the exemplary nozzle 400 of FIGS. 1 and 2 is shown as a single unit from which heated fluid may be impinged onto first major surface 112 of substrate 110 and onto first major surface 121 of substrate 120, it will be appreciated that the herein-discussed impinging may be performed e.g. by the use of two adjacent but physically separated units one of which impinges heated fluid through fluid delivery outlet 420 onto first major surface 112 of substrate 110 and the other of which impinges heated fluid through fluid delivery outlet 430 onto first major surface 121 of substrate 120. Thus, while the term "nozzle" is used herein for convenience of discussion, the apparatus (e.g., nozzle) described herein should be understood to encompass apparatus in which a single unit impinges fluid onto both substrates as well as a multiple-unit apparatus in which one unit impinges fluid onto one substrate and another unit (which may be a physically separate unit) impinges fluid onto the other substrate.

Nozzle 400 may comprise solid (i.e., impermeable) partitions 425 and 425' (seen in the portions of FIGS. 2-4 that are exposed by the partial cutaways) that at least partially define first fluid delivery channel 421. Partitions 425 and 425' may longitudinally bound first fluid delivery channel 421 and/or first fluid delivery outlet 420, by which is meant that partitions 425 and 425' may collectively define the distance which first fluid delivery channel 421 and/or first fluid delivery outlet 420 extend in a direction aligned with longitudinal axis "L" of first substrate 110 (and likewise along first substrate path 232), e.g. as seen in FIGS. 3 and 4. Likewise, nozzle 400 may comprise partitions 436 and 436' (as seen in FIG. 2) that similarly at least partially define, e.g. longitudinally bound, second fluid delivery channel 431 and/or second fluid delivery outlet 430 with respect to second substrate 120.

Nozzle 400 may further comprise partitions 442 and 442' that may further define fluid delivery channel 421, second fluid delivery channel 431, or both. Partitions 442 and 442' may transversely bound first fluid delivery channel 421 and/or first fluid delivery outlet 420; that is, such partitions may define the distance to which first fluid delivery channel 421 and/or first fluid delivery outlet 420 extend in a direction aligned with the transverse axis "T" of first substrate 110. Partitions 442 and/or 442' may likewise define similar transverse distances for second fluid delivery channel 431 and/or second fluid delivery outlet 430. In the exemplary embodiments of FIGS. 1-4 (and which may be most easily appreciated in the view shown in FIG. 4), partitions 442 and 442' may comprise external partitions which at least partially define the exterior housing of nozzle 400. However, in some instances partitions 442 and/or 442' may comprise internal partitions which are contained inside an external housing of nozzle 400.

The terminal ends of partitions 425, 425', 442 and 442' that are closest to first substrate path 232 may collectively define fluid delivery outlet 420, e.g. as shown in FIGS. 3 and 4. Such terminal ends of partitions may be the only elements that define fluid delivery outlet 420 if outlet 420 does not comprise a fluid-permeable sheet (described later in detail) at its working face. Similarly, the terminal ends of partitions 436, 436', 442 and 442' that are closest to second substrate path 233 may collectively define fluid delivery outlet 430.

For convenience of description, first fluid delivery outlet 420 is characterized as comprising working face 424, which can be most conveniently considered to be the surface through which the heated fluid passes as it exits outlet 420. Working face 424 may be an imaginary surface, such as an imaginary arcuate surface (e.g., a section of a cylindrical surface) defined by terminal ends of partitions 425, 425', 442 and 442'. Or, working face 424 may comprise a physical layer, e.g. a fluid-permeable sheet, as discussed later herein in detail. Second fluid delivery outlet 430 is likewise characterized as comprising working face 434.

As disclosed herein, first fluid delivery outlet 420, and second fluid delivery outlet 430, are defined as being in diverging relation. The term diverging relation can be defined by way of axis 423 drawn normal to working face 424 of first fluid delivery outlet 420, and axis 433 drawn normal to working face 434 of second fluid delivery outlet 430, both e.g. as depicted in FIG. 2. By diverging relation is meant that normal axis 423 of first fluid delivery outlet 420, and normal axis 433 of second fluid delivery outlet 430, when extended from their respective working faces in a direction away from nozzle 400, do not intersect regardless of how far they are extended. By diverging relation is additionally meant that normal axis 423 and normal axis 433 are oriented at least 25 degrees away from each other (by way of example, in FIG. 2, normal axis 423 and normal axis 433 are oriented approximately 90 degrees away from each other). In various embodiments, normal axes 423 and 433 are oriented at least about 40, at least about 60, or at least about 80 degrees away from each other. In further embodiments, normal axes 423 and 433 are oriented at most about 140, at most about 120, or at most about 100 degrees away from each other.

Those of ordinary skill in the art will realize that in embodiments with arcuate fluid delivery outlets (described below in more detail), the relative orientation of normal axes 423 and 433 may be at least slightly different at various points along the longitudinal extent of each working face. In such cases, the denoting that two fluid delivery outlets are in diverging relation means that at least the portions of the two outlets that are in closest proximity to each other (e.g., the portions of outlets 420 and 430 that are proximal to tip 435 of nozzle 400) are in diverging relation.

First and second fluid delivery outlets 420 and 430 arranged in diverging relation as disclosed herein may be particularly advantageous for the directing of heated fluid onto two converging substrates. In particular, such fluid delivery outlets in diverging relation allow nozzle 400 to be placed closely adjacent to a lamination nip established by backing rolls, e.g., in the manner depicted in FIGS. 1 and 2. Although discussed herein primarily in the context of bonding substrates together, it will be appreciated that the use of fluid delivery outlets arranged in diverging relation may find other uses in the heating, treating, etc., of substrates for other purposes.

In the exemplary illustration of FIGS. 1-3, first fluid delivery outlet 420 is longitudinally arcuate. That is, it exhibits curvature when traveling along its working face 424 in a direction generally aligned with (i.e. parallel to) the longitudinal axis of substrate 110 and likewise generally aligned with first substrate path 232. In the particular embodiments of FIGS. 1-3 working face 424 is generally longitudinally congruent with (that is, has a generally similar curvature as and generally parallels) first substrate path 232 and with first major surface 231 of backing roll 230. This may be advantageous in allowing some or all portions of working face 424 of first fluid delivery outlet 420 to be placed in close proximity, and generally equidistant, to backing roll 230. Thus, in various embodiments, in operation of nozzle 400, working face 424 of first fluid delivery outlet 420 may be less than about 10, 5 or 2 mm from first major surface 112 of substrate 110, at the point of closest approach. Likewise, in the exemplary illustration of FIGS. 1 and 2, second fluid delivery outlet 430 is longitudinally arcuate with a working face 434 that is generally congruent with second substrate path 233 and with major surface 221 of backing roll 220. This may be advantageous in allowing working face 434 of second fluid delivery outlet 430 to be placed in close proximity to backing roll 220. In various embodiments, in operation of nozzle 400, working face 434 of second fluid delivery outlet 430 may be less than about 10, 5 or 2 mm from first major surface 121 of substrate 120, at the point of closest approach.

In embodiments in which backing surfaces 231 and 221 are major surfaces of (cylindrical) backing rolls, the working face of each outlet may comprise an arcuate shape that is a section of a generally cylindrical surface with a radius of curvature matching that of the surface of the backing roll to which the outlet is to be mated. In embodiments in which backing roll 220 and backing roll 230 are of similar or the same diameter, fluid delivery outlets 420 and 430 may be symmetric (e.g., such that the working faces of the two fluid delivery outlets each display a similar or identical curvature). However, if backing roll 220 and backing roll 230 differ in diameter, as in the embodiment shown in FIGS. 1 and 2, the curvature of first fluid delivery outlet 420 may differ from that of second fluid delivery outlet 430. In some embodiments (e.g. as shown in FIGS. 2 and 3) first fluid delivery outlet 420 and/or second fluid delivery outlet 430 may be generally flat and at a constant distance from backing rolls 230 and 220, across their transverse extent (that is, their extent along a direction generally aligned with the transverse axis of substrate 120), which may also aid in positioning one or both fluid delivery outlets advantageously close to the face of its respective backing roll. In some embodiments, the working surface of a fluid delivery outlet may not necessarily be congruent with the backing roll to which it is mated. For example, either or both of outlets 420 and 430 could be generally planar (flat) rather than being longitudinally arcuate as shown in FIGS. 2 and 3. While this may mean that the fluid delivery outlet may not be able to be positioned as close to the backing roll, and the distance from the working face to the backing roll may vary along the length of the fluid delivery outlet, this may still be acceptable in some cases.

First fluid delivery outlet 420, and working face 424 thereof, may comprise a longitudinal extent, which is defined as the distance that outlet 420 and working face 424 thereof extend in a direction generally aligned with the longitudinal axis of first substrate 110 and thus along first substrate path 232 (such an extent may often comprise an at least slightly arcuate path generally congruent to first major backing surface 231). Such a longitudinal extent may often be defined collectively by the terminal ends of partitions 425 and 425' (i.e., at working face 424). Outlet 430, and working face 434 thereof, may likewise comprise a longitudinal extent, which is similarly defined as the extent that outlet 430 and working face 434 thereof extend in a direction generally along the longitudinal axis of second substrate 120 and thus along second substrate path 233 (e.g., parallel to, and along the circumferential direction of, second major backing surface 221). Such a longitudinal extent of outlet 430 may often be defined by the distance between the terminal ends of partitions 436 and 436' (i.e., at working face 434). Fluid delivery outlets 420 and 430 may be chosen to have any suitable longitudinal extent. Outlets 420 and 430 may or may not have the same transverse extent.

Outlet 420, and working face 424 thereof, may further comprise a transverse extent, meaning the distance that outlet 420 and working face 424 thereof extend in a direction that is generally transverse to first substrate path 232 and that is generally aligned with the transverse axis of first substrate 110. Such a transverse extent may often be defined by the distance between the terminal ends of partitions 442 and 442' (i.e., at working face 424), as seen most easily in the view of FIG. 4. Outlet 430, and working face 434 thereof, may likewise comprise a transverse extent, meaning the extent that the outlet and working face extend in a direction that is generally transverse to second substrate path 233 and that is generally aligned with the transverse axis of second substrate 120. Such a transverse extent may often be defined by the distance between the terminal ends of partitions 442 and 442' (i.e., at working face 434). Fluid delivery outlets 420 and 430 may be chosen to have any suitable transverse extent (e.g., as bounded by partitions 442 and 442'). Often, such a transverse extent may be chosen to be at least slightly greater than the transverse width of substrate 110, or of substrate 120. Outlets 420 and 430 may or may not have the same transverse extent.

It should be understood that in some embodiments first fluid delivery outlet 420 and working face 424 thereof, and similarly second fluid delivery outlet 430 and working face 434 thereof, may comprise a long axis. In some embodiments (as discussed in detail later herein), such a long axis of a fluid delivery outlet may be generally aligned with the transverse extent of the outlet (and a short axis of a fluid delivery outlet may be aligned with the longitudinal extent of the outlet). It will be understood that, as defined and described above, the longitudinal extent and transverse extent of fluid delivery outlet 420 are defined with respect to the longitudinal and transverse axes of substrate 110, not with respect to any long axis of outlet 420. Thus, outlet 420 may comprise a long axis that is oriented generally along outlet 420's transverse extent so that the transverse extent of 420 may be longer than its longitudinal extent (e.g., as in the exemplary embodiment shown in FIG. 4). Similar considerations apply to second fluid delivery outlet 430 and working face 434 thereof.

As mentioned, the working face of a fluid delivery outlet may be open; or, it may comprise a fluid-permeable sheet through which the heated fluid may be passed. Such a fluid-permeable sheet (e.g., sheet 426 of FIGS. 3 and 4) may render the flow of heated fluid through the outlet more uniform, e.g. over the longitudinal extent of the outlet. Additionally, depending on the characteristics of the sheet, the sheet may redirect the fluid somewhat away from its original direction of flow through the fluid delivery channel. For example, with reference to FIGS. 2-4, heated fluid from supply 410 may enter and flow at least partially down fluid delivery channel 421 in a direction that is at an angle to working face 424 of first fluid delivery outlet 420, but in passing through a fluid-permeable sheet at working face 424 of fluid delivery outlet 420 the fluid may be at least somewhat directed to flow in a direction more closely aligned with normal axis 423 of the working face 424 (e.g., as shown by the multiple arrows denoting fluid flow in FIG. 2). Such a design may have advantages in causing the heated fluid to be impinged on substrate 110 in a direction closer to normal to the substrate, as opposed to impinging on substrate 110 in a more tangential orientation. Partitions 425 and/or 425' may also serve such a purpose; additionally, internal baffles or flow directors (not shown in any figure) within fluid delivery channels 421 may also be used to direct the heated fluid in a desired direction. Similar considerations apply with regard to the presence of a fluid-permeable sheet on working face 434 of outlet 430, partitions 436 and 436', and internal baffles or flow directors within second fluid delivery channel 431.

In various embodiments, a fluid-permeable sheet (e.g., sheet 426) may comprise through-openings that collectively provide the sheet with a percent open area of at least about 10, at least about 20, at least about 30, or at least about 40. In further embodiments, the fluid-permeable sheet may comprise a percent open area of at most about 90, at most about 80, or at most about 70. In specific embodiments, the fluid-permeable sheet may comprise a discontinuous (e.g., perforated) screen with through-openings of a diameter of at least about 0.2 mm, at least about 0.4 mm, or at least about 0.6 mm. The fluid-permeable sheet may comprise e.g. a perforated screen with through-openings of a diameter of at most about 4 mm, at most about 2 mm, or at most about 1.4 mm. The through-openings may be in the form of elongated, e.g. laterally-elongated, slots, as described later in Example 1. The combination of percent open area and through-opening size may be chosen to enhance the uniform heating of the substrate. The screen may be comprised of any material with durability and temperature resistance sufficient for the uses outlined herein. Metal screen, e.g. steel, may be suitable.

The heated fluid may exit the working face of the fluid delivery outlet at any suitable linear velocity. The velocity may be affected and/or determined by the volumetric flowrate of heated fluid supplied to nozzle 400 by supply line 410 (and supply line 411, if present), by the size of the fluid delivery outlets, by the percent open area and/or diameter of the through-holes in a fluid-permeable sheet (if present) at the working face of the outlet, etc. If desired, during operation of apparatus 1 the linear velocity of heated fluid exiting nozzle 400 through outlet 430 can be controlled independently of that exiting through outlet 420. The linear velocity will generally be in the low subsonic range, e.g., less than Mach 0.5, typically less than Mach 0.2. Often, the linear velocity will be in the range of a few meters per second; e.g., less than 50, less than 25, or less than 15 meters per second. As such the heated fluid impingement apparatus and methods used herein can be distinguished from the use of e.g. hot air knives, which often rely on a linear velocity approaching or exceeding sonic velocity.

The area of working faces 424 and 434 of outlets 420 and 430, respectively, may be chosen so as to heat an area of desired size, and may be chosen in consideration of the characteristics of the substrates to be heated (e.g., their width, thickness, density, heat capacity, etc.). Often, outlets with working faces in the range of from about 5 to 50 square centimeters may be used. The volumetric flowrate of the heated fluid, and the temperature of the heated fluid, may be chosen as desired. For melt-bonding applications, the temperature of the heated fluid may be chosen to be at least equal to, or somewhat above, the softening point or melting point of a component of the substrates. Any suitable heated gaseous fluid may be used, with ambient air being a convenient choice. However, dehumidified air, nitrogen, an inert gas, or a gas mixture chosen to have a specific effect (e.g. the promotion of bondability, hydrophobicity, etc.) may be used as desired. The fluid may be heated by an external heater (not shown in any figure) prior to being delivered to nozzle 400 through supply line 410 (and 411, if present). In addition, or instead, heating elements may be supplied within nozzle 400; or additional heating (e.g., resistance heating, infrared heating, etc.) of nozzle 400 may be applied.

As disclosed herein, first fluid delivery outlet 420 may comprise a long axis (e.g. as may be most clearly evident in the view of FIG. 4). Second fluid delivery outlet 430 likewise may comprise a long axis. As disclosed herein, a long axis of at least one of the fluid delivery outlets of nozzle 400 may be oriented at an oblique angle with respect to the path of the substrate onto which it impinges fluid (and thus to the longitudinal axis of the substrate). As defined herein, an oblique angle means that the long axis of a fluid delivery outlet is oriented at least 20 degrees away (in a plus or minus, that is clockwise or counterclockwise direction) from the substrate path and from the longitudinal axis "L" of the substrate. In some embodiments, the long axis of first fluid delivery outlet (s) 420, and the long axis of second fluid delivery outlet(s) 430, are at oblique angles to their respective substrate paths. In certain embodiments, the long axis of at least one of the fluid delivery outlets of nozzle 400 is oriented approximately transversely to the substrate path, meaning that the long axis of the fluid delivery outlet is oriented within plus or minus 20 degrees of the transverse axis of the substrate upon which it impinges fluid (and thus may be oriented at an angle of about e.g. 70 to 110 degrees away from the longitudinal axis of the substrate, and the substrate path). In some embodiments, the long axis of first fluid delivery outlet(s) 420, and the long axis of second fluid delivery outlet(s) 430, are oriented approximately transversely to their respective substrate paths. In particular embodiments, the long axis of at least one of the fluid delivery outlet of nozzle 400 is oriented transversely to the substrate path, meaning that the long axis of the fluid delivery outlet is oriented within plus or minus about 3 degrees of the transverse axis of the substrate upon which it impinges fluid (and thus may be oriented at an angle of about e.g. 87 to 93 degrees away from the longitudinal axis of the substrate, and the substrate path).

While heating of substrates and/or bonding of substrates as described herein may be performed without any special handling of the fluid after it has been impinged on the substrates, in some embodiments it may be advantageous to provide for local removal of the impinged fluid. By local removal is meant that fluid that has been impinged on the surface of a substrate by a nozzle is actively removed from the local vicinity of the fluid impingement nozzle. This is to be contrasted with processes in which the impinged fluid is passively allowed to escape from the local vicinity of the nozzle, either to dissipate into the surrounding atmosphere or to be removed by a device (e.g., a hood, shroud, duct, etc.) that is positioned some distance (e.g., at least a decimeter) away from the fluid impingement nozzle. Such local removal can be achieved by the use of a nozzle of the general type described earlier herein, comprising a fluid delivery channel with a fluid delivery outlet, with the addition of at least one fluid capture inlet that is locally positioned relative to the fluid delivery outlet. By locally positioned it is meant that at their point of closest approach to each other, the fluid capture inlet is located less than 10 mm from the fluid delivery outlet. In various embodiments, at their point of closest approach, the fluid capture inlet is located less than about 5 mm, or less than about 2 mm, from the fluid delivery outlet.

Exemplary locally positioned first fluid capture inlets 428 and 428' are shown in FIGS. 3 and 4, with arrows indicating the direction of fluid flow out of fluid delivery outlet 420 and into fluid capture inlets 428 and 428'. In the plan view of FIG. 4 as well as plan views of other embodiments in FIGS. 6-10, arrows with heads pointing down and to the right signify fluid flow into-plane (i.e., out of a fluid delivery outlet toward a substrate); arrows with heads pointing up and to the right signify fluid flow out-of-plane (i.e., into a fluid capture inlet). Fluid capture inlets 428 and 428' may comprise working faces 429 and 429', in similar manner as described earlier herein with respect to fluid delivery outlets. Such fluid capture inlets may be fluidly connected to one or more fluid removal channels (e.g., fluid removal channels 427 and 427' of FIGS. 3 and 4), through which fluid that has been captured by the fluid capture inlet can be actively removed (e.g., by way of an exhaust line fluidly connected to an external suction blower, not shown in any figure). The fluid capture inlet can locally remove a substantial volume percent of the impinged fluid from the local vicinity of the nozzle before the impinged fluid is able to exit the local vicinity of the substrate and irreversibly disperse into the surrounding atmosphere so as to no longer be locally removable.

In some embodiments, the at least one fluid delivery outlet is longitudinally flanked both up-path and down-path along the substrate path, by locally positioned fluid capture inlets, e.g. as in the exemplary illustration shown in FIGS. 2-4.

It will be appreciated that in the particular illustrative embodiment of FIGS. 3 and 4, working face 424 of fluid delivery outlet 420 is defined by fluid-permeable sheet 426, whereas working faces 429 and 429' of fluid capture inlets 428 and 428' comprise no such sheet and thus are defined merely by the terminal ends of partitions (e.g., including partitions 442, 442', 425 and 425') in the manner previously described herein. However, in various embodiments, a fluid-permeable sheet may be provided at the working face of one or more fluid capture inlets. Such a fluid-permeable sheet may comprise similar properties (e.g., of percent open area etc.) as that of a fluid-permeable sheet provided at the working face of the fluid delivery outlet to which the fluid capture inlet is locally positioned, and may be a continuation of the fluid-permeable sheet of the fluid delivery outlet. In other embodiments, the fluid-permeable sheet of a fluid capture inlet, if present, may comprise different properties, and/or be comprised of different materials, than the fluid-permeable sheet of a fluid delivery outlet, if present.

While in the exemplary embodiment of FIGS. 3 and 4, fluid delivery outlet 420 and fluid delivery channel 421 thereof, and fluid capture inlets 428 and 428' and fluid removal channels 427 and 427' thereof, are shown as one unit, with common partitions 425 and 425' therebetween, it should be understood that the herein-discussed impinging and removal of fluids may be performed by the use of two or more adjacent but physically separated units, at least one of which impinges heated fluid through fluid delivery outlet 420 and at least another of which locally captures the impinged fluid through fluid capture inlet 428 or 428'. Thus, while the term "nozzle" is used herein for convenience of discussion, the apparatus (e.g., nozzle) described herein should be understood to encompass apparatus in which a single unit both impinges fluid and captures the impinged fluid, as well as multiple-unit apparatus in which one or more units impinge fluid and one or more additional units (which may be physically separate units) capture the impinged fluid.

Referring again to the simplified one fluid delivery outlet, one substrate illustration of FIGS. 3 and 4, when active suction is applied to fluid removal channels 427 and 427' (e.g., by an external suction fan or blower), a substantial volume percent of the heated fluid that exits working face 424 of fluid delivery outlet 420 and is impinged upon first major surface 112 of substrate 110, may be locally captured by fluid capture inlets 428 and 428' and removed by way of fluid removal channels 427 and 427'. It has been found that such local capture of impinged fluid may alter the flow patterns of the fluid after, during, or possibly even before it impinges on surface 112 of substrate 110. For example, such local capture may modify, reduce or substantially eliminate fluid flow stagnation phenomena in which the fluid impinges onto the substrate in such manner as to drastically slow or even stop the flow of the fluid in certain locations. In altering the flow patterns, the local capture may advantageously modify (e.g., increase) the heat transfer coefficient between the impinging fluid and the substrate in certain locations and/or it may provide a more uniform transfer of heat across a wider area of the substrate. For example, such local capture of impinged fluid may furthermore allow heated fluid of lower, e.g. considerably lower, temperature to be used while still heating the substrates sufficiently to allow bonding, in comparison to the impinging fluid temperature needed in the absence of such local capture. Such local capture may also allow faster line speed of substrates to be used.

Working faces 429 and 429' of fluid capture inlets 428 and 428' may be positioned approximately even with working face 424 of fluid delivery outlet 420, so that working faces 429, 429' and 424 are generally equidistant from surface 112 of substrate 110, as in the exemplary illustration of FIG. 3. Nozzle 400 may be positioned such that these working faces are all positioned within about 10, about 5, or about 2 mm, of first major surface 112 of substrate 110.

Although not shown in any Figures, second fluid delivery outlet 430 may similarly comprise at least one locally positioned second fluid capture inlet, and the features and discussions presented above with regard to first fluid capture inlets 428 apply in similar manner to second fluid capture inlets.

In some embodiments, substantially all of the fluid that exits a fluid delivery outlet and impinges on a substrate may be captured by locally positioned fluid capture inlets before the impinged fluid is able to penetrate longitudinally (e.g. in a direction generally aligned with the substrate path) beyond the boundaries of the fluid capture inlets to any significant extent. In other embodiments, apparatus 1 may be operated such that some portion of the impinged fluid is able to penetrate beyond the boundaries of the fluid capture inlets (and hence may locally mix with ambient air surrounding apparatus 1 to at least a small extent) but in which the suction provided by the fluid capture inlets is sufficiently strong that substantially all of the impinged fluid is still eventually captured by the fluid capture inlets. In some embodiments, apparatus 1 may be operated such that substantially all of the impinged fluid is captured by the capture inlets and in which some portion of the ambient air is also captured by the capture inlets. When apparatus 1 is operated in this manner, in various embodiments the volumetric flow rate of captured ambient air can range up to about 10%, up to about 20%, or up to about 40%, of the volumetric flow rate of captured impinged fluid.

Again, while FIGS. 3 and 4 only show a single fluid capture inlet and a single substrate for convenience of describing the basic premise of local fluid capture, it will be understood that nozzle 400, and all other nozzles described later herein, may be used to impinge heated fluids on two converging substrates and to locally remove the impinged fluids from the local vicinity of the nozzle, e.g. in the general manner exemplified in FIGS. 1 and 2. It will thus be understood that the comprehensive discussions herein regarding the structure, orientation, functioning, etc., of first fluid delivery outlet 420, first fluid capture inlet 428, etc., with regard to the impinging of fluids onto first substrate 110 and the local removal of the impinged fluids, are likewise applicable to the functioning of second fluid delivery outlet 430 and associated locally positioned second fluid capture inlets, etc., with regard to the impinging of fluids onto second substrate 120 and the local removal of the impinged fluids.

Figure 5:
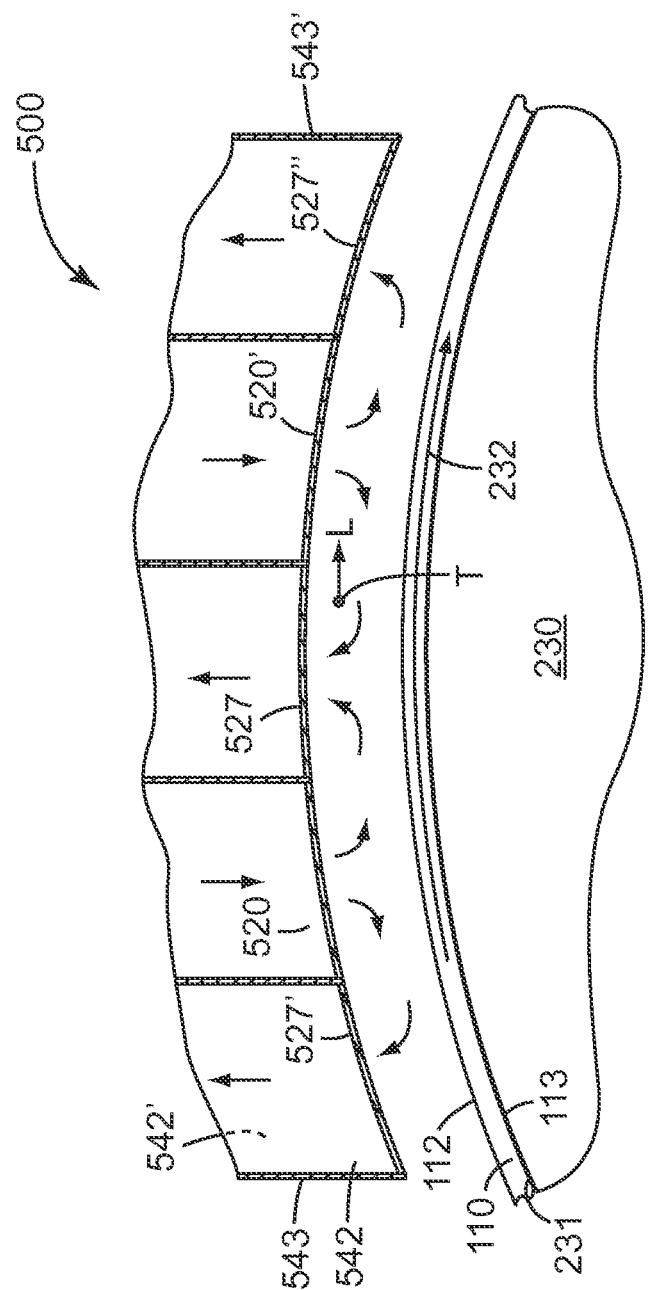
FIG. 5 is an expanded side view in partial cutaway of a portion of another exemplary apparatus and process.
Figure 6:
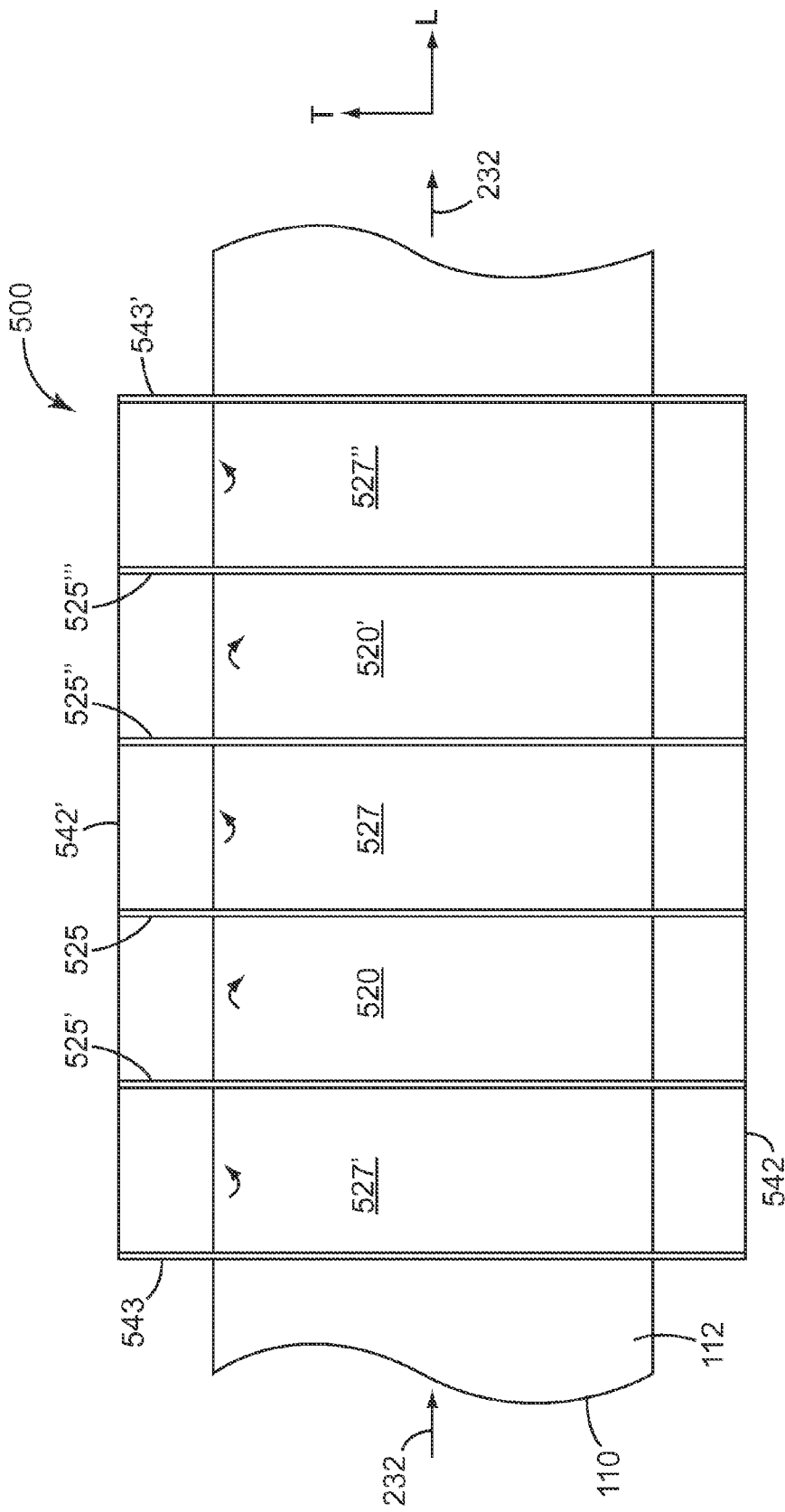
FIG. 6 is a plan view in cutaway of a portion of the exemplary apparatus and process of FIG. 5.

In some cases it may be desirable to provide a plurality (e.g., two, three, four, eight, sixteen, or more) of longitudinally-spaced fluid delivery outlets that impinge fluid onto a substrate, with a fluid capture inlet being interspersed between at least some of the pairs of longitudinally-spaced fluid delivery outlets. An exemplary nozzle 500 of this general type is shown in side view in FIG. 5 and in plan view in FIG. 6. The view of FIG. 6 is from the same orientation as FIG. 4, except that in FIG. 6 all of the features of nozzle 500 except the fluid delivery outlets and fluid capture inlets, and the terminal ends of partitions that define the outlets and inlets, are omitted for clarity. It will be understood that these outlets and inlets may have working faces, may be fluidly connected to fluid delivery/removal channels, etc., in like manner to the previous descriptions of such components and functionalities with respect to nozzle 400. FIGS. 5 and 6 depict a plurality of fluid delivery outlets, e.g. fluid delivery outlets 520 and 520', that are longitudinally spaced along the longitudinal axis of substrate 110 (and thus along substrate path 232), and that have fluid capture inlet 527 interspersed therebetween. Fluid delivery outlets 520 and 520' each comprise a long axis that is obliquely oriented with respect to path 232 of substrate 110 and to the longitudinal axis "L" of substrate 110 (in the particular design shown in FIGS. 5 and 6, they are both oriented transversely).

Figure 7:
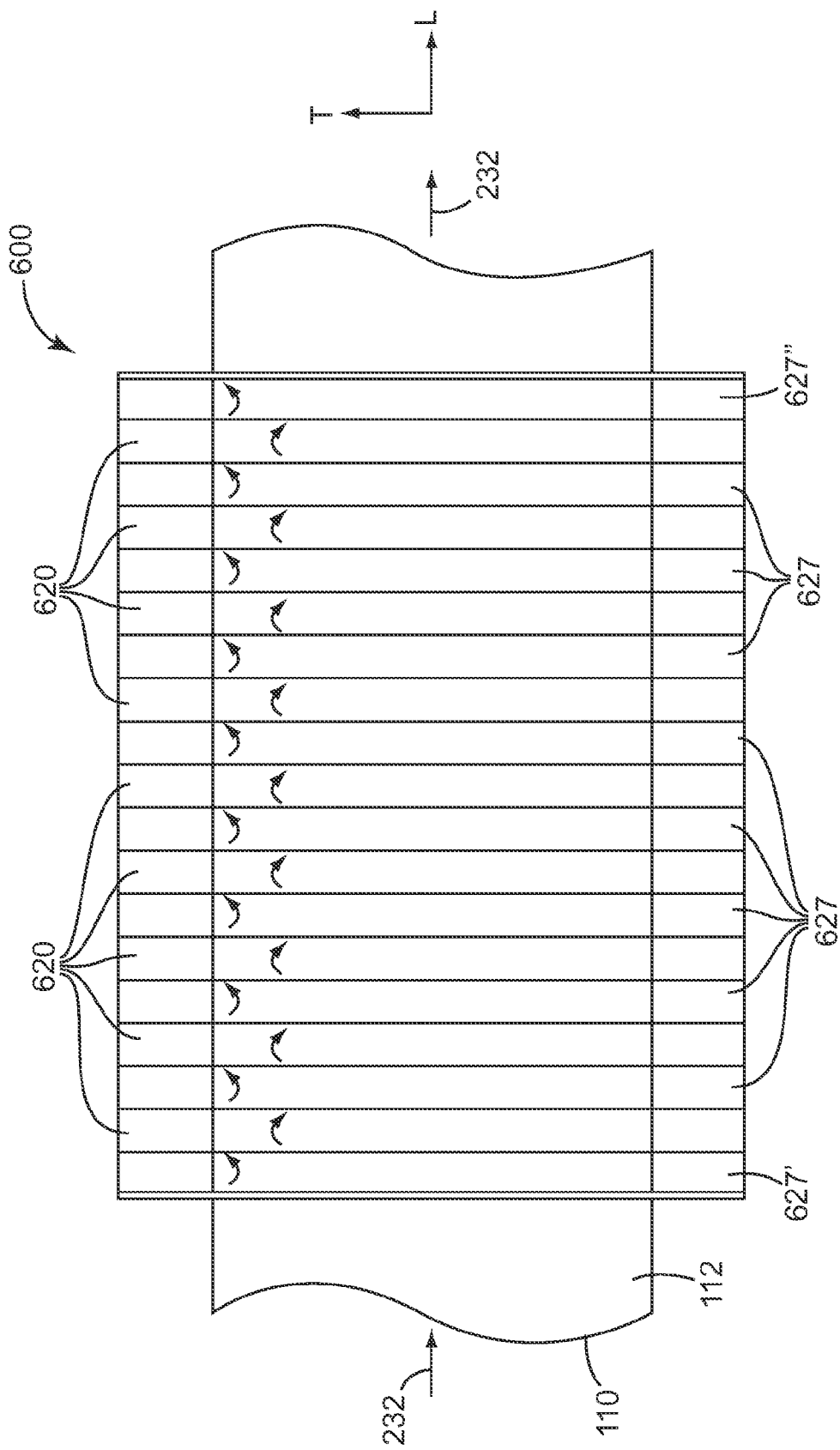
FIG. 7 is a plan view in cutaway of a portion of another exemplary apparatus and process.

In addition to fluid capture inlet 527 that is interspersed (sandwiched) between fluid delivery outlets 520 and 520', nozzle 500 may optionally comprise fluid capture inlets 527' and 527" that longitudinally flank the plurality of longitudinally-spaced first fluid delivery outlets 520 and 520'. By longitudinally flanks is meant that a locally positioned fluid capture inlet is placed either up-path or down-path, along the longitudinal axis of substrate 110 and substrate path 232, from the plurality of fluid delivery outlets. While both longitudinal ends of the plurality of fluid delivery outlets are longitudinally flanked in the exemplary embodiment of FIGS. 5 and 6, in some cases it may be desired to provide such a flanking fluid capture inlet only on one longitudinal end of the plurality of fluid delivery outlets. In some embodiments the fluid capture inlets may each comprise a long axis. Often, the long axes of the fluid capture inlets may be generally aligned with those of the fluid delivery outlets to which the fluid capture inlets are locally positioned (e.g., as shown in FIG. 6, and also as shown in FIG. 7, discussed later herein).

In arrangements of the general type shown in FIGS. 5 and 6, substrate 110 may, in following substrate path 232, travel successively past a plurality of fluid delivery outlets which may be, e.g. obliquely, approximately transversely, or transversely aligned with respect to substrate 110, and with fluid capture inlets interspersed between the fluid delivery outlets and optionally with further fluid capture inlets longitudinally flanking the plurality of fluid delivery outlets. It will be appreciated that such an arrangement may provide for enhanced uniformity in the manner in which heated fluid is impinged upon substrate 110. It should however be noted that it is not necessary that the different fluid delivery outlets (e.g., 520 and 520') deliver fluid of the exact same temperature. If desired, the fluids can be of different temperatures (for example, the fluid delivered through outlet 520 can be at a lower temperature than that delivered through outlet 520', e.g. if it is desired to heat substrate 110 in a more gradual manner). The fluid delivery outlets and fluid capture inlets of nozzle 500 are defined by partitions (e.g., 525, 525', 525", 525''', 542, 542', 543, and 543"), in similar manner as was described previously for the outlets and inlets of nozzle 400, and will not be discussed in further detail. Again, while the plurality of first fluid delivery outlets and associated first fluid capture inlets has been presented and discussed with reference to the simplified, one substrate view of FIGS. 5 and 6, it will be understood thus such discussions are likewise applicable to such second fluid delivery outlets and associated second fluid capture inlets as may be present in nozzle 500 but that are not shown in FIGS. 5 and 6 for ease of presentation.

As mentioned, any desired number of longitudinally-spaced fluid delivery outlets, interspersed by fluid-capture inlets and optionally longitudinally flanked by fluid capture inlets may be used. Thus, another exemplary arrangement is shown in FIG. 7 in plan view (in similar manner as the view of FIG. 6). Nozzle 600 of FIG. 7 comprises nine fluid delivery outlets 620 (all numbered identically for convenience), with eight fluid capture inlets 627 (again, all numbered identically for convenience) longitudinally interspersed therebetween, and with additional fluid capture inlets 627' and 627" longitudinally flanking the plurality of fluid delivery outlets 620. In FIG. 7, all of the fluid delivery outlets 620, and the fluid capture inlets 627, 627' and 627", are shown as being transversely oriented with respect to substrate path 232 and the long axis "L" of substrate 120. However it will again be understood that such orientation could be approximately transverse, or oblique, as desired.

Regardless of the number of fluid delivery outlets and/or fluid capture inlets, in various embodiments, at least about 60%, at least about 80%, or substantially all, of the total volumetric flow of impinged fluid may be locally captured by the fluid capture inlets (e.g., the plurality of first fluid capture inlets and the plurality of second fluid capture inlets) and removed through fluid removal channels that are fluidly connected to the fluid capture inlets.

Figure 8:
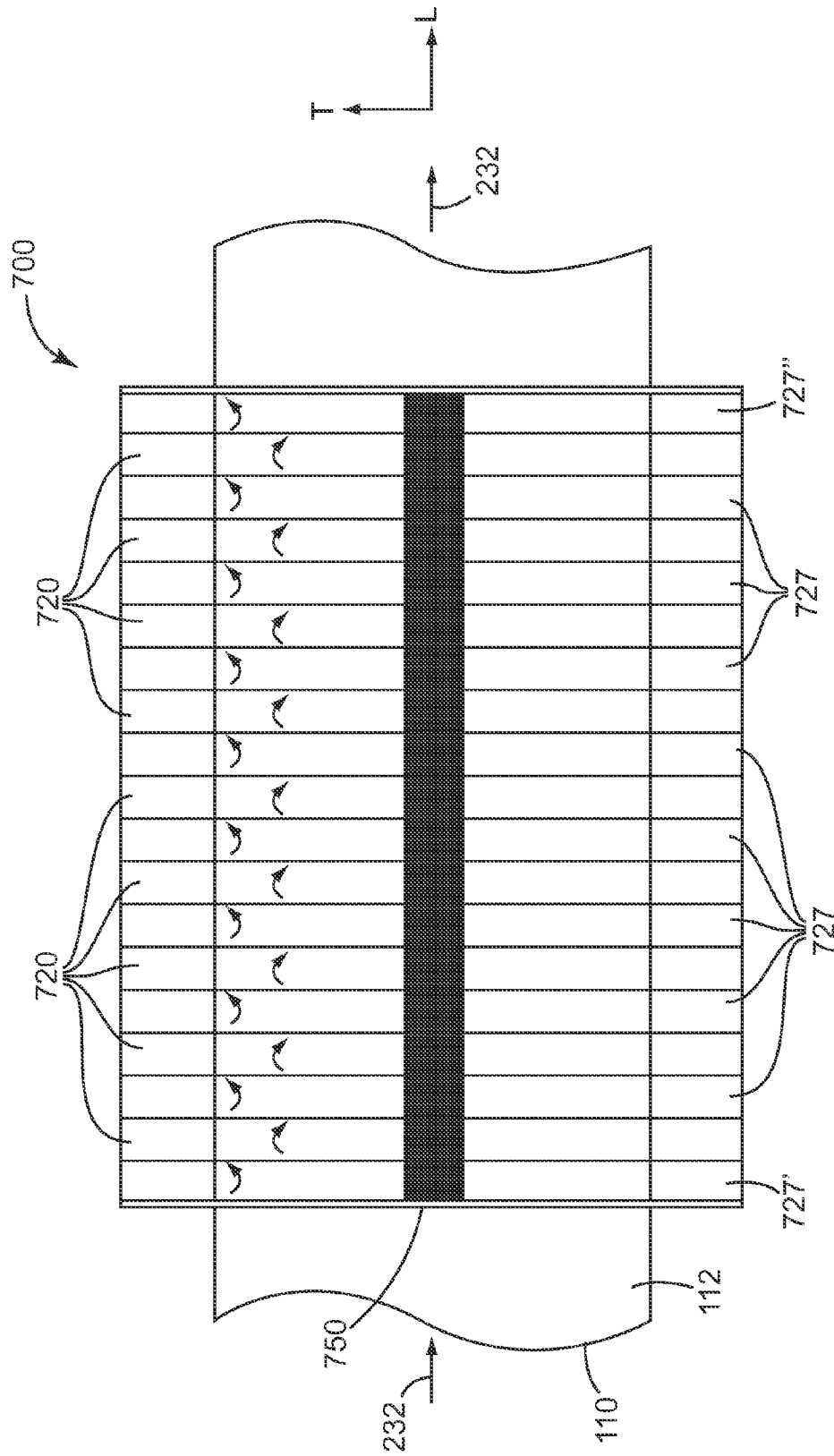
FIG. 8 is a plan view in cutaway of a portion of another exemplary apparatus and process.

In some embodiments, it may be desired that at least some portions of at least some fluid delivery outlets be flow-blocked (meaning that essentially no fluid flow may occur through these portions). For example, it may be desired to avoid impinging fluid (e.g., to avoid heating and/or bonding) on one or more longitudinally-oriented portions, (e.g. longitudinally-running stripes) of a substrate. Thus, another exemplary embodiment is depicted in FIG. 8, in which nozzle 700 comprises flow-blocking plates 750 in certain portions of fluid delivery outlets 720. Such a flow-blocking plate may be any entity that substantially prevents fluid flow (e.g., a sheet metal plate, although it does not necessarily have to be sheet-like or plate-like in shape, or made of metal). Such a flow-blocking plate may conveniently be placed at the working face of a fluid delivery outlet (e.g., may be a piece of sheet metal substituted in place of a fluid-permeable sheet); however, a flow-blocking plate may be placed at any location (e.g., at least slightly upstream within a fluid delivery channel) as long as the desired flow-blocking is achieved.

Such flow-blocking plates may be inserted individually into particular locations of at least some fluid delivery outlets (e.g., one or more locations that are selected along the transverse extent of each fluid delivery outlet, noting again that in this context transverse is with respect to substrate path 232, which in the exemplary embodiment of FIG. 8 corresponds to the long axis of each fluid delivery outlet 720). The flow-blocked locations of different fluid delivery outlets may be longitudinally aligned generally along substrate path 232, e.g. if it is desired to impart substrate 110 with e.g. a longitudinally-oriented stripe in which fluid has not been impinged upon it (e.g. as shown in the exemplary design of FIG. 8). Flow-blocking plates may or may not additionally be used in fluid capture inlets (such plates are present in fluid capture inlets 727 and 727' and 727" in the illustrative design of FIG. 8). Multiple individual flow-blocking plates may be placed in individual fluid delivery outlets and/or fluid capture inlets; or, in some cases, a single continuously-extending plate may be used to block all desired portions of fluid delivery outlets and inlets. Only the longitudinally-interspersed fluid capture inlets may have such portions thereof flow-blocked; or, if desired, one or both longitudinally-flanking fluid capture inlets may also have such portions thereof flow-blocked.

In the exemplary design of FIG. 8, only a single longitudinally-oriented flow-blocked portion (extending longitudinally over a plurality of fluid-delivery outlets 720) is present. In some cases it may be desired to provide multiple, longitudinally-oriented, transversely-spaced flow-blocked portions, for example in the case in which it is desired to leave more than one transversely-spaced longitudinal portion (e.g., stripe) of a substrate unimpinged upon by fluid issuing from nozzle 700.

The above discussion concerned flow-blocked portions of fluid-delivery outlets which portions are arranged so as to alter (e.g., substantially minimize or prevent) the impingement of fluid onto longitudinally-oriented portions (e.g. stripes) of a substrate. In general, it may be desired to provide flow-blocked portions of one or more fluid-delivery outlets, which portions may be arranged so as to alter the extent to which a portion of a substrate has fluid impinged upon it as it follows its substrate path. That is, flow-blocking plates may be arranged so as to modify or control the dwell time that a section of the substrate remains exposed to the impinged fluid. Such flow-blocking plates can be arranged to only modify the dwell time of a particular longitudinally-extending portion of the substrate (those of ordinary skill will appreciate that the particular exemplary design of FIG. 8 represents one particular special case of this type). Or, such flow-blocking plates can be arranged so as to modify the dwell time of the entire width of the substrate (e.g., the entire transverse extent (along axis "T") of one or more fluid delivery outlets 720 of FIG. 8 could be flow-blocked). Any such combination of these flow-blocking arrangements may be envisioned. In some embodiments, the flow-blocking plates may be adjustable (e.g., movable so that they block more or less of a particular fluid delivery outlet) during the operation of apparatus 1; e.g., in response to process conditions. Fluid-capture inlets may also be correspondingly flow-blocked as well, if desired.

Figure 9:
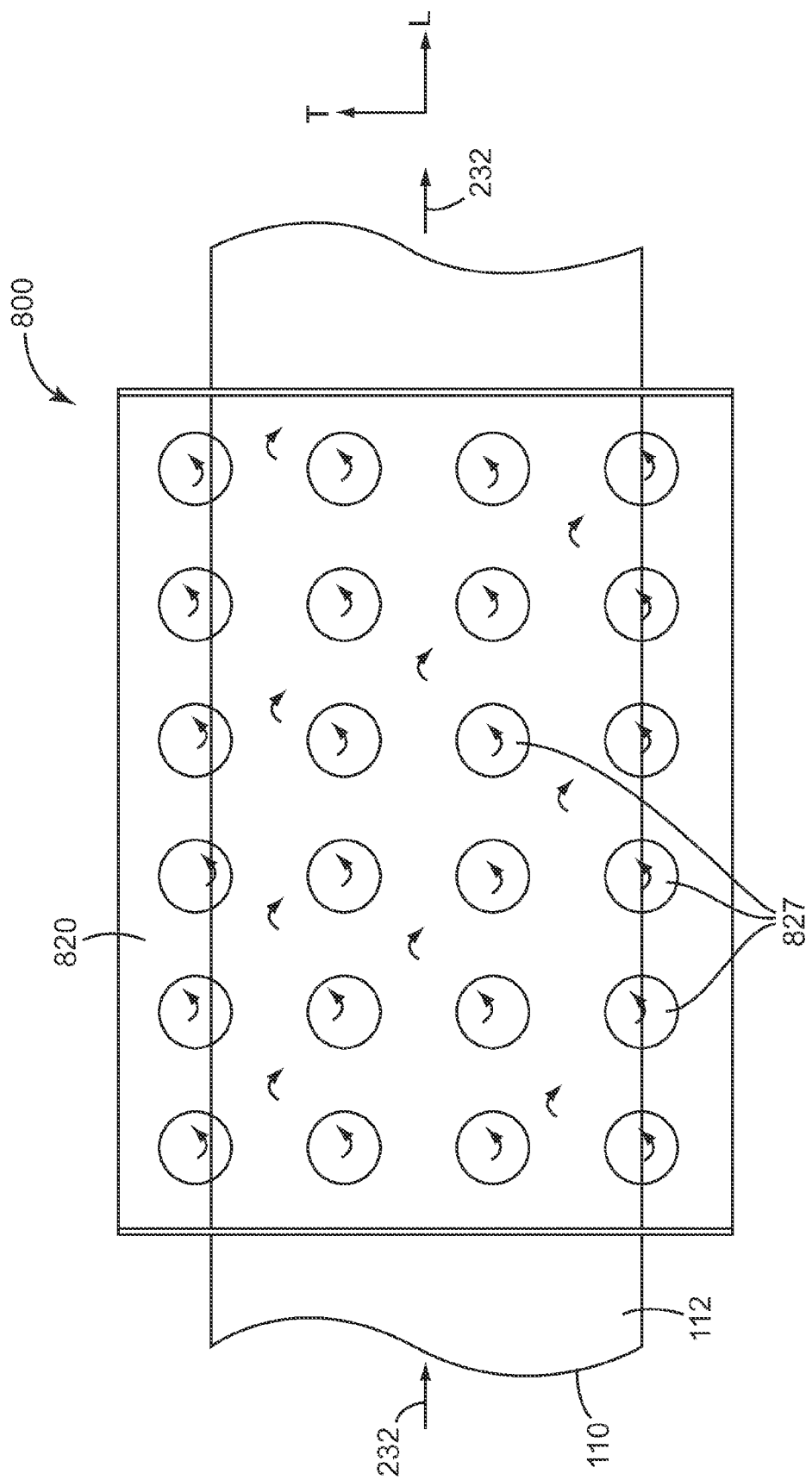
FIG. 9 is a plan view in cutaway of a portion of another exemplary apparatus and process.

The condition that at least a portion of a portion of a long axis of the first fluid delivery outlet is oriented obliquely, or approximately transversely, or transversely, to a substrate path also encompasses designs of the general type shown in FIG. 9. In nozzle 800 of FIG. 9 is a single fluid delivery outlet 820 in the form of a manifold that extends contiguously both longitudinally and transversely with respect to substrate path 232. A plurality of discrete fluid capture inlets 827 are provided within fluid delivery manifold 820 and are bounded within the area occupied by manifold 820. Fluid capture inlets 827 may e.g. be placed in a regular (e.g., square, hexagonal, etc.) array or may be placed randomly within the perimeter of single fluid delivery outlet 820, and the spacing, shape, and/or size (e.g., diameter) thereof may be chosen as desired. Partitions (e.g., walls) that define individual fluid capture inlets 827 may be spaced apart from partitions that define other fluid capture inlets 827, may be in contact with such partitions, etc., as desired.

Figure 10:
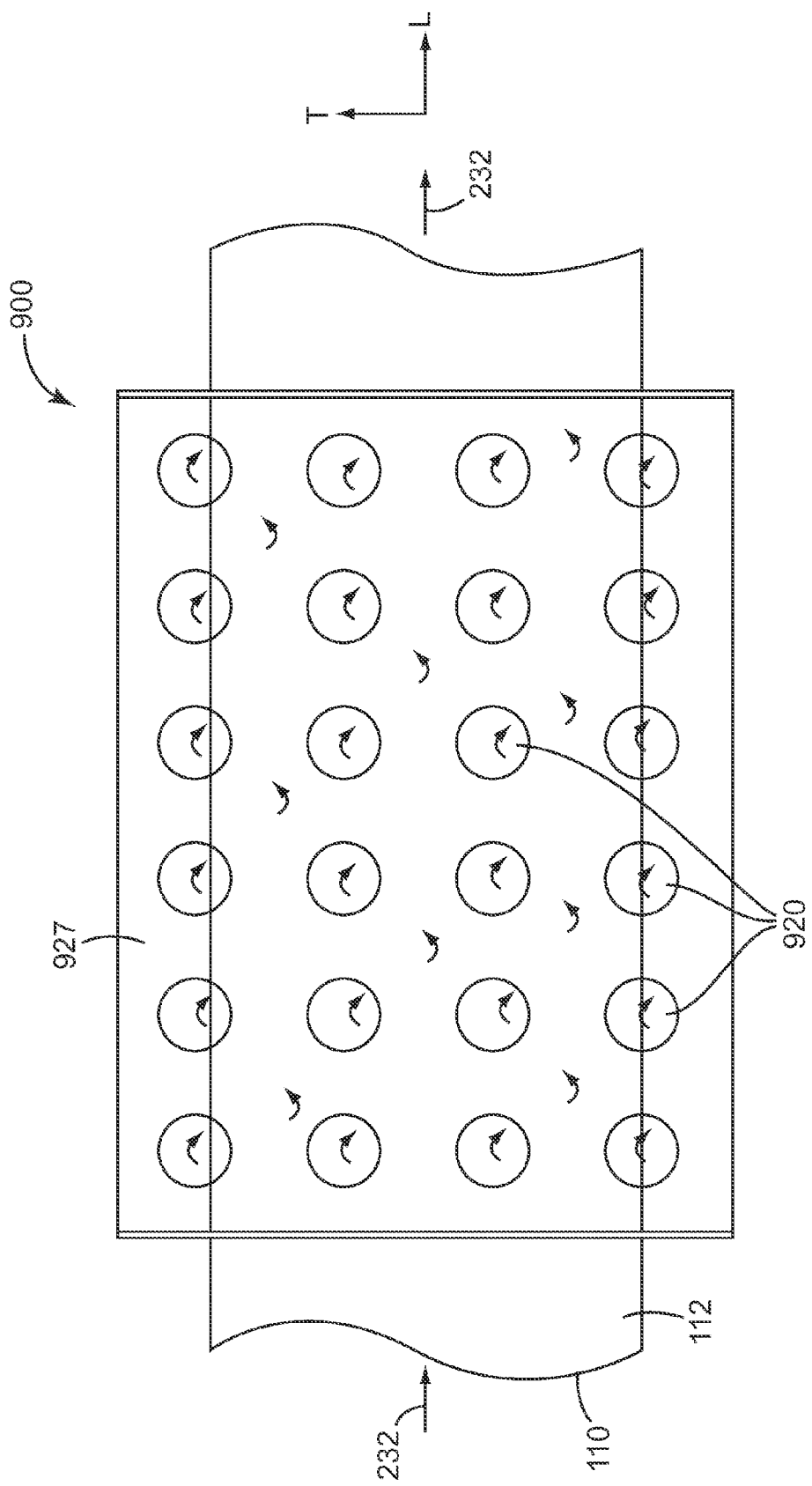
FIG. 10 is a plan view in cutaway of a portion of another exemplary apparatus and process.

The condition that that at least a portion of a portion of a long axis of the first fluid delivery outlet is oriented obliquely, or approximately transverse, or transverse, to a substrate path also encompasses designs of the general type shown in FIG. 10. In nozzle 900 of FIG. 10 is found a single fluid capture inlet 927 in the form of a manifold that extends contiguously both longitudinally and transversely with respect to substrate path 232. A plurality of discrete fluid delivery outlets 920 are provided within fluid capture manifold 927 and are bounded within the area occupied by manifold 927. At least some of fluid delivery outlets 920 may comprise a long axis that is oriented obliquely, approximately transversely, or transversely, with regard to substrate path 232 (noting that FIG. 10 shows the special case of circular fluid delivery outlets in which the long axis and short axis are the same, thus in which any particular axis (diameter) can be chosen as long axis.) Fluid delivery outlets 920 may e.g. be placed in a regular (e.g., square, hexagonal, etc.) array or may be placed randomly within the perimeter of single fluid capture inlet 927. The spacing, shape and/or size (e.g., diameter) of fluid delivery outlets 920 may be chosen as desired. Partitions (e.g., walls) that define individual fluid delivery outlets 920 may be spaced apart from partitions that define other fluid delivery outlets 920, may be in contact with such partitions, etc., as desired.

It will be noted that the exemplary designs shown in FIGS. 3-10 have all been limited to a single half of a nozzle for ease of presenting the figures. It should be kept in mind that all such designs presented herein may comprise an additional plurality of fluid delivery outlets, inlets, etc., in order to likewise impinge fluid upon a second substrate. Although in many cases the two portions of a nozzle that are designed to impinge fluids on two different substrates may be of the same general design, if desired the two nozzle portions might be of different designs (e.g. a nozzle could have one portion e.g. of the type shown in FIG. 8 for impinging fluid upon a first substrate, and another portion e.g. of the type shown in FIG. 9 for impinging fluid upon a second substrate). All such possible combinations of any of the above-described illustrative embodiments are encompassed within the disclosures herein.

Substrates 110 and 120 may be any substrates upon which it is desired to impinge one or more fluids. In particular, substrates 110 and 120 may be any substrates which are desired to be bonded to each other. Substrates 110 and/or 120 may be made of any suitable thermoplastic polymeric material (e.g., a material that is melt-bondable). Such materials may include e.g. polyolefins, polyesters, polyamides, and various other materials. Examples of suitable polyolefins include polyethylene, polypropylene, polybutylene, ethylene copolymers, propylene copolymers, butylene copolymers, and copolymers and blends of these materials. The substrate may comprise various additives and the like, as are well known in the art, as long as such additives do not unacceptably reduce the ability of the substrate to be melt bonded. Substrates 110 and/or 120 may be multilayer, e.g. a coextruded multilayer films. In some embodiments, substrates 110 and/or 120 may comprise a preformed substrate, by which is meant that the substrate is a pre-existing, previously-made entity whose physical properties have generally fully developed. This should be contrasted e.g. with a case in which a substrate is made (e.g., extruded) and taken generally directly into the herein-described bonding process in a condition in which it is still generally molten, semi-molten, soft, or the like. In some embodiments, substrates 110 and/or 120 do not comprise any adhesive (i.e., hot melt adhesive, pressure sensitive adhesive, and the like) e.g. in the form of coatings on a major surface of the substrate.

In some embodiments, the major surfaces of substrates 110 and/or 120 may be free of protrusions. In other embodiments, optional protrusions may protrude from a major surface of substrates 110 and/or 120. Bonding as described herein may be particularly advantageous in the melt-bonding of a fibrous web to a substrate that comprises protrusions (in particular, male fastening elements), because the bonding may be able to be performed without significantly damaging (e.g. deforming, crushing, flattening, etc.) the protrusions in the bonded area.

In some embodiments, substrates 110 and/or 120 may be continuous, i.e. without any through-penetrating holes. In other embodiments, substrates 110 and/or 120 may be discontinuous, i.e. comprising through-penetrating perforations and the like. In some embodiments, substrates 110 and/or 120 may be comprised of a dense, nonporous material. In some embodiments, substrates 110 and/or 120 may be comprised of a porous material.

In some embodiments substrates 110 and/or 120 may be a fibrous web, encompassing any suitable fibrous web with sufficient mechanical strength to be handled as a self-supporting web and to be subjected to the bonding processes described herein. In some embodiments, substrates 110 and/or 120 comprise a nonwoven fibrous web. Any suitable self-supporting nonwoven fibrous web may be used, made of any material as desired, as long as the herein-described bonding can be performed. The nonwoven fibrous web may be e.g. a carded web, spunbonded web, a spunlaced web, an airlaid web, or a meltblown web (i.e., as long as such a web has undergone sufficient processing as to render it self-supporting). The nonwoven fibrous web may be a multilayer material with, for example, at least one layer of a meltblown web and at least one layer of a spunbonded web, or any other suitable combination of nonwoven webs. For instance, the nonwoven fibrous web may be a spunbond-meltblown-spunbond, spunbond-spunbond, spunbond-spunbond-spunbond, or spunbond-meltblown-meltspun-meltblown-spunbond multilayer material. Or, the web may be a composite web comprising a nonwoven layer and a dense film layer, as exemplified by webs comprising nonwoven fibers bonded in arcuately protruding loops to a dense film backing and available from 3M Company, St. Paul, Minn., under the trade designation Extrusion Bonded Loop.

Such a fibrous web may be made of any suitable thermoplastic polymeric material (e.g., a material that is melt-bondable). Such materials may include e.g. polyolefins, polyesters, polyamides, and various other materials. Examples of suitable polyolefins include polyethylene, polypropylene, polybutylene, ethylene copolymers, propylene copolymers, butylene copolymers, and copolymers and blends of these materials. The fibers may be monocomponent or multicomponent (e.g., bicomponent), as desired.

Those of ordinary skill in the art will appreciate that the composition of at least a major surface of substrate 110, and that of at least a major surface of substrate 120, may advantageously be chosen so as to enhance the bonding process. For example, a major surface, or the entirety of, substrate 110, and a major surface of, or the entirety of, substrate 120, may be comprised substantially of the same polymer (e.g. polypropylene).

Further details of apparatus, components, methods, etc., which may be used in connection with the disclosures herein, and further details of substrates which may be e.g. bonded together using the apparatus and methods disclosed herein, can be found in U.S. Provisional Patent Application Ser. No. 61/288,952 titled BONDED SUBSTRATES AND METHODS FOR BONDING SUBSTRATES; and, U.S. Provisional Patent Application Ser. No. 61/288,959 titled APPARATUS AND METHODS FOR IMPINGING FLUIDS ON SUBSTRATES, both filed on Dec. 22, 2009, both of which are incorporated by reference in their entirety herein for this purpose.

LIST OF EXEMPLARY EMBODIMENTS

Embodiment 1

An apparatus for impinging a fluid onto a first surface of a first substrate that is moving along a first substrate path and impinging a fluid onto a first surface of a second substrate that is moving along a second substrate path and locally removing the impinged fluids, comprising: at least one first fluid delivery outlet with a long axis that is oriented obliquely to the first substrate path; at least one first fluid capture inlet that is locally positioned relative to the first fluid delivery outlet; at least one second fluid delivery outlet with a long axis that is oriented obliquely to the second substrate path; at least one second fluid capture inlet that is locally positioned relative to the second fluid delivery outlet; and wherein the at least one first fluid delivery outlet and the at least one second fluid delivery outlet are in diverging relation.

Embodiment 2

The apparatus of embodiment 1 wherein the long axis of the at least one first fluid delivery outlet is oriented approximately transversely to the first substrate path and wherein the long axis of the at least one second fluid delivery outlet is oriented approximately transversely to the second substrate path Embodiment 3

The apparatus of any of embodiments 1-2 wherein the long axis of the at least one first fluid delivery outlet is oriented transversely to the first substrate path and wherein the long axis of the at least one second fluid delivery outlet is oriented transversely to the second substrate path.

Embodiment 4

The apparatus of any of embodiments 1-3 wherein the at least one first fluid delivery outlet comprises a longitudinal extent that is generally aligned with the first substrate path and comprises a transverse extent that is generally transverse to the first substrate path and that is shorter in extent than the longitudinal extent of the at least one first fluid delivery outlet, and wherein the at least one second fluid delivery outlet comprises a longitudinal extent that is generally aligned with the second substrate path and comprises a transverse extent that is generally transverse to the second substrate path and that is shorter in extent than the longitudinal extent of the at least one second fluid delivery outlet.

Embodiment 5

The apparatus of any of embodiments 1-4 wherein the at least one first fluid delivery outlet is longitudinally flanked both up-path and down-path along the first substrate path by locally positioned first fluid capture inlets, and wherein the at least one second fluid delivery outlet is longitudinally flanked both up-path and down-path along the second substrate path by locally positioned second fluid capture inlets.

Embodiment 6

The apparatus of any of embodiments 1-5 wherein the apparatus comprises a plurality of first fluid delivery outlets that are longitudinally spaced along the first substrate path with first fluid capture inlets longitudinally interspersed between the first fluid delivery outlets, and with first fluid capture inlets longitudinally flanking the plurality of longitudinally-spaced first fluid delivery outlets both up-path and down-path along the first substrate path; and wherein the apparatus further comprises a plurality of second fluid delivery outlets with that are longitudinally spaced along the second substrate path with second fluid capture inlets longitudinally interspersed between the second fluid delivery outlets, and with second fluid capture inlets longitudinally flanking the plurality of longitudinally-spaced second fluid delivery outlets both up-path and down-path along the second substrate path.

Embodiment 7

The apparatus of embodiment 6 wherein at least some longitudinally-aligned portions of at least some of the first fluid delivery outlets, and optionally at least some longitudinally-aligned portions of the second fluid delivery outlets, are flow-blocked.

Embodiment 8

The apparatus of embodiment 7 wherein portions of at least the longitudinally-interspersed first fluid capture inlets that are longitudinally aligned with the flow-blocked portions of the first fluid delivery outlets are flow-blocked Embodiment 9

The apparatus of any of embodiments 1-8 wherein the at least one first fluid delivery outlet comprises a first fluid delivery manifold that extends contiguously both longitudinally and transversely relative to the first substrate path and within whose area is contained a plurality of discrete first fluid capture inlets.

Embodiment 10

The apparatus of any of embodiments 1-9 wherein the at least one first fluid capture inlet comprises a first fluid capture manifold that extends contiguously both longitudinally and transversely relative to the first substrate path and within whose area is contained a plurality of discrete first fluid delivery outlets.

Embodiment 11

The apparatus of any of embodiments 1-10 wherein at least one of the fluid delivery outlets comprises a working face comprising a fluid-permeable sheet.

Embodiment 12

The apparatus of embodiment 11 wherein the fluid-permeable sheet comprises a discontinuous screen with through-openings providing the sheet with a percent open area of between 20% and 80%.

Embodiment 13

A method of impinging a heated fluid onto a first surface of a first substrate that is moving along a first substrate path and impinging a fluid onto a first surface of a second substrate that is moving along a second substrate path and locally removing the impinged fluids, the method comprising: providing at least one first fluid delivery outlet and at least one first fluid capture inlet that is locally positioned relative to the first fluid delivery outlet; passing the first moving substrate by the at least one first fluid delivery outlet along a first substrate path such that a long axis of the at least one first fluid delivery outlet is oriented obliquely to the first substrate path and impinging heated fluid from the at least one first fluid delivery outlet onto the first major surface of the first moving substrate; providing at least one second fluid delivery outlet and at least one second fluid capture inlet that is locally positioned relative to the second fluid delivery outlet; passing the second moving substrate by the at least one second fluid delivery outlet along a second substrate path such that a long axis of the at least one second fluid delivery outlet is oriented obliquely to the second substrate path and impinging heated fluid from the at least one second fluid delivery outlet onto the first major surface of the second moving substrate; and, locally capturing at least 60% of the total volumetric flow of impinged fluid by way of the fluid capture inlets and removing the locally captured fluid through fluid removal channels that are fluidly connected to the fluid capture inlets; and wherein the first and second moving substrates are converging substrates.

Embodiment 14

The method of embodiment 13 wherein ambient air from an atmosphere surrounding the moving substrates is captured by the fluid capture inlets and removed by the fluid removal channels, the volumetric flow of captured ambient air being at least about 20% of the volumetric flow of the locally captured impinged fluid.

Embodiment 15

The method of any of embodiments 13-14 wherein the nominal velocity of the fluid passing through the fluid delivery outlets is less than 0.2 Mach.

Embodiment 16

The method of any of embodiments 13-15 further comprising bringing the first surface of the first moving substrate and the first surface of the second moving substrate into contact with each other and bonding the first surface of the first moving substrate to the first surface of the second moving substrate.

Embodiment 17

The method of any of embodiments 13-16 wherein the second major surface of the first moving substrate is in contact with the first major surface of a first backing roll and the second major surface of the second moving substrate is in contact with the second major surface of a second backing roll, and wherein the at least one first fluid delivery outlet is longitudinally arcuate with a shape that is generally congruent with the first major surface of the first backing roll, and wherein the at least one second fluid delivery outlet is longitudinally arcuate with a shape that is generally congruent with the surface of the second backing roll.

Embodiment 18

The method of any of embodiments 13-17 wherein the long axis of the at least one first fluid delivery outlet is oriented transversely to the first substrate path and wherein the long axis of the at least one second fluid delivery outlet is oriented transversely to the second substrate path.

Embodiment 19

The method of any of embodiments 13-18 wherein the apparatus comprises a plurality of first fluid delivery outlets that are longitudinally spaced along the first substrate path with first fluid capture inlets longitudinally interspersed between the first fluid delivery outlets, and with first fluid capture inlets longitudinally flanking the plurality of longitudinally-spaced first fluid delivery outlets both up-path and down-path along the first substrate path; and wherein the apparatus further comprises a plurality of second fluid delivery outlets with that are longitudinally spaced along the second substrate path with second fluid capture inlets longitudinally interspersed between the second fluid delivery outlets, and with second fluid capture inlets longitudinally flanking the plurality of longitudinally-spaced second fluid delivery outlets both up-path and down-path along the second substrate path.

Embodiment 20

The method of any of embodiments 13-19 wherein at least some longitudinally-aligned portions of at least some of the first fluid delivery outlets, and optionally at least some longitudinally-aligned portions of the second fluid delivery outlets, are flow-blocked.

Embodiment 21

The method of embodiment 20 wherein portions of at least the longitudinally-interspersed first fluid capture inlets that are longitudinally aligned with the flow-blocked portions of the first fluid delivery outlets are flow-blocked.

Embodiment 22

The method of any of embodiments 13-21, wherein the method uses an apparatus comprising any of embodiments 1-12.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather by the structures described by the language of the claims, and the equivalents of those structures. To the extent that there is a conflict or discrepancy between this specification and the disclosure in any document incorporated by reference herein, this specification will control.

What is claimed is:

1. An apparatus for impinging a fluid onto a first surface of a first substrate that is moving along a first substrate path and impinging a fluid onto a first surface of a second substrate that is moving along a second substrate path and locally removing the impinged fluids, comprising:
    at least one first fluid delivery outlet with a long axis that is oriented obliquely to the first substrate path;
    at least one first fluid capture inlet that is locally positioned relative to the first fluid delivery outlet;
    at least one second fluid delivery outlet with a long axis that is oriented obliquely to the second substrate path;
    at least one second fluid capture inlet that is locally positioned relative to the second fluid delivery outlet;
    and wherein the at least one first fluid delivery outlet and the at least one second fluid delivery outlet are in diverging relation.

2. The apparatus of claim 1 wherein the long axis of the at least one first fluid delivery outlet is oriented approximately transversely to the first substrate path and wherein the long axis of the at least one second fluid delivery outlet is oriented approximately transversely to the second substrate path.

3. The apparatus of claim 2 wherein the long axis of the at least one first fluid delivery outlet is oriented transversely to the first substrate path and wherein the long axis of the at least one second fluid delivery outlet is oriented transversely to the second substrate path.

4. The apparatus of claim 3 wherein the at least one first fluid delivery outlet comprises a longitudinal extent that is generally aligned with the first substrate path and comprises a transverse extent that is generally transverse to the first substrate path and that is shorter in extent than the longitudinal extent of the at least one first fluid delivery outlet, and wherein the at least one second fluid delivery outlet comprises a longitudinal extent that is generally aligned with the second substrate path and comprises a transverse extent that is generally transverse to the second substrate path and that is shorter in extent than the longitudinal extent of the at least one second fluid delivery outlet.

5. The apparatus of claim 2 wherein the at least one first fluid delivery outlet is longitudinally flanked both up-path and down-path along the first substrate path by locally positioned first fluid capture inlets, and wherein the at least one second fluid delivery outlet is longitudinally flanked both up-path and down-path along the second substrate path by locally positioned second fluid capture inlets.

6. The apparatus of claim 2 wherein the apparatus comprises a plurality of first fluid delivery outlets that are longitudinally spaced along the first substrate path with first fluid capture inlets longitudinally interspersed between the first fluid delivery outlets, and with first fluid capture inlets longitudinally flanking the plurality of longitudinally-spaced first fluid delivery outlets both up-path and down-path along the first substrate path; and
    wherein the apparatus further comprises a plurality of second fluid delivery outlets with that are longitudinally spaced along the second substrate path with second fluid capture inlets longitudinally interspersed between the second fluid delivery outlets, and with second fluid capture inlets longitudinally flanking the plurality of longitudinally-spaced second fluid delivery outlets both up-path and down-path along the second substrate path.

7. The apparatus of claim 6 wherein at least some longitudinally-aligned portions of at least some of the first fluid delivery outlets, and optionally at least some longitudinally-aligned portions of the second fluid delivery outlets, are flow-blocked.

8. The apparatus of claim 7 wherein portions of at least the longitudinally-interspersed first fluid capture inlets that are longitudinally aligned with the flow-blocked portions of the first fluid delivery outlets are flow-blocked.

9. The apparatus of claim 2 wherein the at least one first fluid delivery outlet comprises a first fluid delivery manifold that extends contiguously both longitudinally and transversely relative to the first substrate path and within whose area is contained a plurality of discrete first fluid capture inlets.

10. The apparatus of claim 2 wherein the at least one first fluid capture inlet comprises a first fluid capture manifold that extends contiguously both longitudinally and transversely relative to the first substrate path and within whose area is contained a plurality of discrete first fluid delivery outlets.

11. The apparatus of claim 2 wherein at least one of the fluid delivery outlets comprises a working face comprising a fluid-permeable sheet.

12. The apparatus of claim 11 wherein the fluid-permeable sheet comprises a discontinuous screen with through-openings providing the sheet with a percent open area of between 20% and 80%.

* * * * *

UNITED STATES PATENT AND TRADEMARK OFFICE
CERTIFICATE OF CORRECTION

Page 1 of 1

PATENT NO. : 9,126,224 B2
APPLICATION NO. : 13/029155
DATED : September 8, 2015
INVENTOR(S) : Kristopher Biegler It is certified that error appears in the above-identified patent and that said Letters Patent is hereby corrected as shown below:

Specification

Column 4
Line 25, delete "so a" and insert --so as--, therefor.

Column 16
Line 13, delete "that that" and insert --that--, therefor.

Column 18
Line 46, delete "path" and insert --path.--, therefor.

Column 19
Line 48, delete "flow-blocked" and insert --flow-blocked.--, therefor.

Signed and Sealed this
Nineteenth Day of April, 2016

Michelle K. Lee
*Director of the United States Patent and Trademark Office*